US007522979B2

(12) United States Patent
Pillar

(10) Patent No.: US 7,522,979 B2
(45) Date of Patent: Apr. 21, 2009

(54) EQUIPMENT SERVICE VEHICLE HAVING ON-BOARD DIAGNOSTIC SYSTEM

(75) Inventor: Duane R. Pillar, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 601 days.

(21) Appl. No.: 10/420,187

(22) Filed: Apr. 22, 2003

(65) Prior Publication Data

US 2003/0200015 A1 Oct. 23, 2003

Related U.S. Application Data

(63) Continuation of application No. 09/500,506, filed on Feb. 9, 2000, now Pat. No. 6,553,290.

(51) Int. Cl.
G01M 17/00 (2006.01)
B60Q 1/00 (2006.01)

(52) U.S. Cl. .............................. 701/33; 701/29; 701/31; 340/438

(58) Field of Classification Search ............. 701/29–35, 701/36, 39, 43–44, 62–63, 70, 76, 92, 97, 701/57–59, 33.29; 340/425.5, 439, 438; 345/700, 763, 819–820, 850–851
See application file for complete search history.

(56) References Cited

U.S. PATENT DOCUMENTS

| 3,720,863 A | 3/1973 | Ringland et al. |
| 4,041,470 A | 8/1977 | Slane et al. |
| 4,162,714 A | 7/1979 | Correll |
| 4,180,803 A | 12/1979 | Wesemeyer et al. |
| 4,355,385 A | 10/1982 | Hampshire et al. |
| 4,516,121 A | 5/1985 | Moriyama et al. |
| 4,542,802 A | 9/1985 | Garvey et al. |

(Continued)

FOREIGN PATENT DOCUMENTS

DE 41 11 865 A1 10/1991

(Continued)

OTHER PUBLICATIONS

Test and measurement technology analysis and forecast; Spadaro, J.; Spectrum, IEEE; vol. 34, Issue 1, Jan. 1997 pp.: 74-78; Digital Object Identifier 10.1109/6.560647.*

(Continued)

Primary Examiner—Cuong H Nguyen
(74) Attorney, Agent, or Firm—Foley & Lardner LLP

(57) ABSTRACT

An equipment service vehicle comprises a network communication link, a plurality of vehicle subsystems, a test control module, and an operator interface. The test control module is mounted on board the vehicle and is coupled to the plurality of vehicle subsystems by way of the network communication link. The test control module is programmed to acquire at least some of the information pertaining to the health and operation of a mechanical system. The operator interface is mounted on board the vehicle and is coupled to the test control module. The operator interface comprises a display that displays a menu of test options to an operator and an input device that receives an operator input indicative of a menu selection made by the operator. At least some of the information pertaining to the health and operation is displayed to the operator.

19 Claims, 7 Drawing Sheets

U.S. PATENT DOCUMENTS

| | | | |
|---|---|---|---|
| RE32,140 E | 5/1986 | Tokuda et al. | |
| 4,639,609 A | 1/1987 | Floyd et al. | |
| 4,646,232 A | 2/1987 | Chang et al. | |
| 4,744,218 A | 5/1988 | Edwards et al. | |
| 4,760,275 A | 7/1988 | Sato et al. | |
| 4,809,177 A | 2/1989 | Windle et al. | |
| 4,809,803 A | 3/1989 | Ahern et al. | |
| 4,843,557 A | 6/1989 | Ina et al. | |
| 4,864,154 A | 9/1989 | Copeland et al. | |
| 4,864,568 A | 9/1989 | Sato et al. | |
| 4,894,781 A | 1/1990 | Sato et al. | |
| 4,941,546 A | 7/1990 | Nist et al. | |
| 4,949,808 A | 8/1990 | Garnett | |
| 5,025,253 A | 6/1991 | DiLullo et al. | |
| 5,046,007 A | 9/1991 | McCrery et al. | |
| 5,091,856 A | 2/1992 | Hasegawa et al. | |
| 5,124,915 A | 6/1992 | Krenzel | |
| 5,189,617 A | 2/1993 | Shiraishi | |
| 5,202,830 A | 4/1993 | Tsurumiya et al. | |
| 5,214,582 A * | 5/1993 | Gray | 701/33 |
| 5,365,436 A | 11/1994 | Schaller et al. | |
| 5,416,702 A | 5/1995 | Kitagawa et al. | |
| 5,418,437 A | 5/1995 | Couture et al. | |
| 5,445,347 A | 8/1995 | Ng | |
| 5,463,992 A | 11/1995 | Swenson et al. | |
| 5,493,490 A | 2/1996 | Johnson | |
| 5,508,689 A | 4/1996 | Rado et al. | |
| 5,528,496 A * | 6/1996 | Brauer et al. | 701/32 |
| 5,539,869 A * | 7/1996 | Spoto et al. | 715/207 |
| 5,541,840 A * | 7/1996 | Gurne et al. | 701/33 |
| 5,555,171 A | 9/1996 | Sonehara et al. | |
| 5,557,257 A | 9/1996 | Gieffers | |
| 5,568,023 A | 10/1996 | Grayer et al. | |
| 5,579,227 A * | 11/1996 | Simmons et al. | 701/29 |
| 5,592,375 A | 1/1997 | Salmon et al. | |
| 5,619,412 A | 4/1997 | Hapka | |
| 5,623,169 A | 4/1997 | Sugimoto et al. | |
| 5,636,122 A | 6/1997 | Shah et al. | |
| 5,637,933 A | 6/1997 | Rawlings et al. | |
| 5,638,272 A | 6/1997 | Minowa et al. | |
| 5,657,224 A | 8/1997 | Lonn et al. | |
| 5,670,845 A | 9/1997 | Grant et al. | |
| 5,732,074 A | 3/1998 | Spaur et al. | |
| 5,736,925 A | 4/1998 | Knauff et al. | |
| 5,739,592 A | 4/1998 | Rigsby et al. | |
| 5,754,021 A | 5/1998 | Kojima | |
| 5,774,361 A * | 6/1998 | Colarelli, III et al. | 701/29 |
| 5,793,648 A | 8/1998 | Nagle et al. | |
| 5,794,165 A | 8/1998 | Minowa et al. | |
| 5,812,959 A | 9/1998 | Froeburg et al. | |
| 5,815,126 A | 9/1998 | Fan et al. | |
| 5,819,188 A | 10/1998 | Vos | |
| 5,819,201 A | 10/1998 | DeGraaf | |
| 5,827,957 A | 10/1998 | Wehinger | |
| 5,838,251 A | 11/1998 | Brinkmeyer et al. | |
| 5,844,473 A | 12/1998 | Kaman | |
| 5,845,221 A | 12/1998 | Hosokawa et al. | |
| 5,848,365 A | 12/1998 | Coverdill | |
| 5,856,976 A | 1/1999 | Hirano | |
| 5,864,781 A | 1/1999 | White | |
| 5,884,206 A | 3/1999 | Kim | |
| 5,890,080 A | 3/1999 | Coverdill et al. | |
| 5,896,418 A | 4/1999 | Hamano et al. | |
| 5,913,210 A | 6/1999 | Call | |
| 5,918,180 A | 6/1999 | Dimino | |
| 5,919,237 A | 7/1999 | Balliet | |
| 5,922,040 A | 7/1999 | Prabhakaran | |
| 5,928,291 A | 7/1999 | Jenkins et al. | |
| 5,930,742 A | 7/1999 | Dodd, Jr. et al. | |
| 5,945,919 A | 8/1999 | Trask | |
| 5,948,025 A | 9/1999 | Sonoda | |
| 5,949,330 A | 9/1999 | Hoffman et al. | |
| 5,950,144 A | 9/1999 | Hall et al. | |
| 5,957,985 A | 9/1999 | Wong et al. | |
| 5,985,454 A | 11/1999 | McMordie et al. | |
| 5,987,365 A | 11/1999 | Okamoto | |
| 5,995,898 A | 11/1999 | Tuttle | |
| 5,997,338 A | 12/1999 | Pohjola | |
| 5,999,104 A | 12/1999 | Symanow et al. | |
| 6,012,004 A | 1/2000 | Sugano et al. | |
| 6,033,041 A | 3/2000 | Koga et al. | |
| 6,038,500 A | 3/2000 | Weiss | |
| 6,041,310 A | 3/2000 | Green et al. | |
| 6,065,565 A | 5/2000 | Puszkiewicz et al. | |
| 6,070,538 A | 6/2000 | Flamme et al. | |
| 6,088,650 A | 7/2000 | Schipper et al. | |
| 6,096,978 A | 8/2000 | Pohjola | |
| 6,097,998 A * | 8/2000 | Lancki | 701/33 |
| 6,112,152 A | 8/2000 | Tuttle | |
| 6,125,356 A | 9/2000 | Brockman et al. | |
| 6,135,806 A | 10/2000 | Pohjola | |
| 6,141,608 A | 10/2000 | Rother | |
| 6,141,610 A | 10/2000 | Rothert et al. | |
| 6,154,122 A | 11/2000 | Menze | |
| 6,154,658 A | 11/2000 | Caci | |
| 6,157,889 A | 12/2000 | Baker | |
| 6,181,994 B1 | 1/2001 | Colson et al. | |
| 6,182,807 B1 | 2/2001 | Saito et al. | |
| 6,208,948 B1 | 3/2001 | Klingler et al. | |
| 6,212,449 B1 * | 4/2001 | Wellman et al. | 701/29 |
| 6,219,626 B1 * | 4/2001 | Steinmetz et al. | 702/183 |
| 6,223,104 B1 | 4/2001 | Kamen et al. | |
| 6,230,496 B1 | 5/2001 | Hofmann et al. | |
| 6,232,874 B1 | 5/2001 | Murphy | |
| 6,240,365 B1 | 5/2001 | Bunn | |
| 6,241,593 B1 * | 6/2001 | Chen et al. | 701/48 |
| 6,243,628 B1 | 6/2001 | Bliley et al. | |
| 6,244,758 B1 | 6/2001 | Solymar et al. | |
| 6,246,320 B1 | 6/2001 | Monroe | |
| 6,256,580 B1 | 7/2001 | Meis et al. | |
| 6,263,268 B1 | 7/2001 | Nathanson | |
| 6,263,269 B1 | 7/2001 | Dannenberg | |
| 6,281,790 B1 | 8/2001 | Kimmel et al. | |
| 6,285,932 B1 | 9/2001 | de Bellefeuille et al. | |
| 6,331,365 B1 | 12/2001 | King | |
| 6,338,010 B1 | 1/2002 | Sparks et al. | |
| 6,356,826 B1 | 3/2002 | Pohjola | |
| 6,370,454 B1 | 4/2002 | Moore | |
| 6,404,607 B1 | 6/2002 | Burgess et al. | |
| 6,405,114 B1 | 6/2002 | Priestley et al. | |
| 6,411,874 B2 | 6/2002 | Morgan et al. | |
| 6,421,593 B1 | 7/2002 | Kempen et al. | |
| 6,429,773 B1 | 8/2002 | Schuyler | |
| 6,430,164 B1 | 8/2002 | Jones et al. | |
| 6,430,488 B1 | 8/2002 | Goldman et al. | |
| 6,434,512 B1 * | 8/2002 | Discenzo | 702/184 |
| 6,466,258 B1 | 10/2002 | Mogenis et al. | |
| 6,487,717 B1 | 11/2002 | Brunemann et al. | |
| 6,496,775 B2 | 12/2002 | McDonald, Jr. et al. | |
| 6,501,368 B1 | 12/2002 | Wiebe et al. | |
| 6,522,955 B1 | 2/2003 | Colborn | |
| 6,539,296 B2 | 3/2003 | Diaz et al. | |
| 6,542,077 B2 | 4/2003 | Joao | |
| 6,549,827 B1 | 4/2003 | Yen | |
| 6,553,290 B1 * | 4/2003 | Pillar | 701/33 |
| 6,580,953 B1 | 6/2003 | Wiebe et al. | |
| 6,609,051 B2 | 8/2003 | Fiechter et al. | |
| 6,609,108 B1 | 8/2003 | Pulliam et al. | |
| 6,611,740 B2 | 8/2003 | Lowrey et al. | |
| 6,611,755 B1 | 8/2003 | Coffee et al. | |
| 6,615,186 B1 | 9/2003 | Kolls | |
| 6,636,790 B1 | 10/2003 | Lightner et al. | |
| 6,640,166 B2 * | 10/2003 | Liebl et al. | 701/29 |
| 6,643,571 B2 | 11/2003 | Götvall et al. | |

| | | | |
|---|---|---|---|
| 6,662,087 B1 * | 12/2003 | Liebl et al. ............. 701/29 | |
| 6,671,594 B2 | 12/2003 | Miller | |
| 6,671,646 B2 | 12/2003 | Manegold et al. | |
| 6,694,234 B2 | 2/2004 | Lockwood et al. | |
| 6,735,504 B2 | 5/2004 | Katagishi et al. | |
| 6,757,597 B2 | 6/2004 | Yakes et al. | |
| 6,795,758 B2 | 9/2004 | Sinex | |
| 6,798,344 B2 | 9/2004 | Faulkner et al. | |
| 6,804,626 B2 | 10/2004 | Manegold et al. | |
| 6,865,460 B2 | 3/2005 | Bray et al. | |
| 6,882,917 B2 | 4/2005 | Pillar et al. | |
| 6,885,920 B2 | 4/2005 | Yakes et al. | |
| 6,892,131 B2 | 5/2005 | Coffee et al. | |
| 6,909,944 B2 | 6/2005 | Pillar et al. | |
| 6,912,453 B2 * | 6/2005 | Le Draoullec et al. ....... 701/29 | |
| 6,917,288 B2 | 7/2005 | Kimmel et al. | |
| 6,922,615 B2 | 7/2005 | Pillar et al. | |
| 6,941,202 B2 | 9/2005 | Wilson et al. | |
| 6,959,235 B1 * | 10/2005 | Abdel-Malek et al. ....... 701/33 | |
| 6,993,420 B2 * | 1/2006 | Le Draoullec et al. ....... 701/29 | |
| 6,993,421 B2 | 1/2006 | Pillar et al. | |
| 7,006,902 B2 | 2/2006 | Archer et al. | |
| 7,024,296 B2 | 4/2006 | Squires et al. | |
| 7,034,678 B2 | 4/2006 | Burkley et al. | |
| 7,072,745 B2 | 7/2006 | Pillar et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,209,817 B2 * | 4/2007 | Abdel-Malek et al. ....... 701/33 | |
| 7,254,468 B2 | 8/2007 | Pillar et al. | |
| 7,302,320 B2 | 11/2007 | Nasr et al. | |
| 7,363,128 B2 * | 4/2008 | Dietsch et al. ............. 701/29 | |
| 2001/0034573 A1 | 10/2001 | Morgan et al. | |
| 2001/0034656 A1 | 10/2001 | Lucas et al. | |
| 2001/0044769 A1 | 11/2001 | Chaves | |
| 2002/0010643 A1 | 1/2002 | Chaves | |
| 2002/0015354 A1 | 2/2002 | Buckelew | |
| 2002/0049523 A1 | 4/2002 | Diaz et al. | |
| 2002/0065594 A1 | 5/2002 | Squires et al. | |
| 2002/0065707 A1 | 5/2002 | Lancaster et al. | |
| 2002/0107833 A1 | 8/2002 | Kerkinni | |
| 2002/0111725 A1 | 8/2002 | Burge | |
| 2002/0123832 A1 | 9/2002 | Gotvall et al. | |
| 2002/0133273 A1 | 9/2002 | Lowrey et al. | |
| 2002/0181405 A1 | 12/2002 | Ying | |
| 2003/0001736 A1 | 1/2003 | Lewis | |
| 2003/0046179 A1 | 3/2003 | Anabtawi et al. | |
| 2003/0080619 A1 | 5/2003 | Bray et al. | |
| 2003/0081123 A1 | 5/2003 | Rupe | |
| 2003/0105565 A1 | 6/2003 | Loda et al. | |
| 2003/0105566 A1 | 6/2003 | Miller | |
| 2003/0114965 A1 | 6/2003 | Fiechter et al. | |
| 2003/0130765 A1 | 7/2003 | Pillar et al. | |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0163233 A1 | 8/2003 | Song et al. | |
| 2003/0171854 A1 | 9/2003 | Pillar et al. | |
| 2003/0182034 A1 | 9/2003 | Katagishi et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2003/0233178 A1 | 12/2003 | Sinex | |
| 2004/0002794 A1 | 1/2004 | Pillar et al. | |
| 2004/0019414 A1 | 1/2004 | Pillar et al. | |
| 2004/0024502 A1 | 2/2004 | Squires et al. | |
| 2004/0039502 A1 | 2/2004 | Wilson et al. | |
| 2004/0039504 A1 | 2/2004 | Coffee et al. |
| 2004/0039510 A1 | 2/2004 | Archer et al. |
| 2004/0055802 A1 | 3/2004 | Pillar et al. |
| 2004/0069850 A1 | 4/2004 | De Wilde |
| 2004/0069865 A1 | 4/2004 | Rowe et al. |
| 2004/0070515 A1 | 4/2004 | Burkley et al. |
| 2004/0133319 A1 | 7/2004 | Pillar et al. |
| 2004/0133332 A1 | 7/2004 | Yakes et al. |
| 2004/0199302 A1 | 10/2004 | Pillar et al. |
| 2004/0203974 A1 | 10/2004 | Seibel |
| 2005/0004733 A1 | 1/2005 | Pillar et al. |
| 2005/0038934 A1 | 2/2005 | Gotze et al. |
| 2005/0060246 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0209747 A1 | 9/2005 | Yakes et al. |
| 2005/0234622 A1 | 10/2005 | Pillar et al. |

FOREIGN PATENT DOCUMENTS

| | | |
|---|---|---|
| DE | 624500 A1 * | 11/1994 |
| DE | 29807561 U1 * | 8/1998 |
| DE | 199 29 434 A1 | 12/2000 |
| DE | 19936352 A1 * | 2/2001 |
| DE | DE 101 03 922 A1 | 8/2002 |
| EP | 0 266 704 B1 | 5/1988 |
| EP | 0 504 913 A1 | 9/1992 |
| EP | 0 564 943 B1 | 10/1993 |
| EP | 0 791 506 A2 | 8/1997 |
| EP | 0 949 122 A2 | 10/1999 |
| EP | 1 087 343 A1 | 3/2001 |
| EP | 1 115 264 A2 | 7/2001 |
| EP | 1 229 636 A2 | 8/2002 |
| JP | 10115232 A * | 5/1998 |
| JP | 2000-333160 A | 11/2000 |
| SE | 507 046 C2 | 3/1998 |
| WO | 2 263 376 A | 7/1993 |
| WO | WO 95/15594 A1 | 6/1995 |
| WO | WO 97/02965 A1 | 1/1997 |
| WO | WO 98/30961 A1 | 7/1998 |
| WO | WO99/23783 A2 | 5/1999 |
| WO | WO 99/23783 A2 | 5/1999 |
| WO | WO 00/69662 A1 | 11/2000 |
| WO | WO 00/79727 A2 | 12/2000 |
| WO | WO 01/015001 A2 | 3/2001 |
| WO | WO 03/059455 A2 | 7/2003 |
| WO | WO 03/059455 A3 | 7/2003 |
| WO | WO 03/060831 A2 | 7/2003 |
| WO | WO 03/060831 A3 | 7/2003 |
| WO | WO 03/061235 A2 | 7/2003 |
| WO | WO 03/061235 A3 | 7/2003 |

OTHER PUBLICATIONS

A new ATPG technique (MultiDetect) for testing of analog macros in mixed-signal circuits; Varaprasad, B.K.S.V.L.; Patnaik L.M.; Jamadagni, H.S: Agrawal, V.K.; Computer-Aided Design of Integrated Circuits and Systems, IEEE Transactions on vol. 23, Issue 2, Feb. 2004 pp. 273-287; Digital Object Identifier 10.1109/TCAD.2003.822110.*

Selecting Useful Images from the Web from Mobile Services; DaeHyuck Park; Euisun Kang; ByongHee Lee; JongKeun Kim; Kunjung Sim; Meehwa Cho; YoungHwan Lim; Computer Supported Cooperative Work in Design, 2006, CSCWD '06. 10th International Conference on; May 2006 pp.:1-5 ; Digital Object Identifier 10.1109/CSCWD.2006.253122.*

The Across Mobile Platform Learning system (AMPLe) Supporting Learner - Centered Knowledge ConstructionShelley Shwu-Ching Young; Chia-hang Liang; Networking, International Conference on Systems and International Conference on Mobile Communications and Learning Technologies, 2006. ICN/ICONS/MCL 2006. International Conference on; Apr. 23-29, 2006 Pag.*
Development of a data pre-processing scheme and pluggable application modules for an intelligent equipment prognostics systemYu-Chuan Su; Min-Hsiung Hung; Fan-Tien Cheng; Tsai-Pao Lee; Industrial Informatics, 2005. INDIN '05. 2005 3rd IEEE International Conference on; Aug. 10-12, 2005 pp. :38-43; Digital Object Identifier 10. 1109/INDIN.2005.156.*
Labdileit: electronic instrumentation laboratory through Internet; Turon, R.; Picos, R.; Roca, M.; Isern, E.; Garcia-Moreno, E.; Devices, Circuits and Systems, 2004. Proceedings of the Fifth IEEE International Caracas Conference on; vol. 1, Nov. 3-5, 2004 pp. 147-151; Digital Object Identifier 10.1109/ICCDCS.2004. 1393371.*
A new small-size multi-mode and multi-task software radio prototype for future intelligent transport systems; Harada, H.; Fujise M.; Vehicular Tehnology Conference, 2002. Proceedings, VTC 2002-Fall. 2002 IEEE 56th; vol. 4, Sep. 24-28, 2002 pp.:2366-2370 vol.4; Digital Object Identifier 10.1109/VETECF.2002.1040644.*
A digital library system with mechanisms of collaboration support; Iwamoto, H.; Kamioka, T.; Furuta, S.; Nakajima, T.; Systems, Man, and Cybernetics, 2000 IEEE International Conference on; vol. 1, Oct. 8-11, 2000 pp.:370-375 vol. 1 Digital Object Identifier 10.1109/ICSMC.2000.885619.*
A voice-actuated diagnostic interface for an automotive application; Vogel, J.; Trovato, F.; Mohankrishnan, N.; Circuits and Systems, 1994., Proceedings of the 37th Midwest Symposium on; vol. 2, Aug. 3-5, 1994 pp.:1515-1518 vol.2 Digital Object Identifier 10.1109/MWSCAS.1994.519094.*
General purpose PC based system for the automatic control of tests and calibrations; Castelli, F.; Instrumentation and Measurement Technology Conference, 1994. IMTC/94. Conference Proceedings. 10th Anniversary. Advanced Technologies in I & M., 1994 IEEE; May 10-12, 1994 pp.:631-634 vol. 2; Digital Object Identifier 10.1109/IMTC. 1994.352019.*
Busview: a graphical transit information system; Maclean, S.D.; Daily, D.J.; Intelligent Transportation Systems, 2001. Proceedings. 2001 IEEE; Aug. 25-29, 2001 pp.:1073-1078; Digital Object Identifier 10.1109/ITSC.2001.948811.*
Automatic vehicle location system implementation; Burch, R.C.; Position Location and Navigation Symposium, 1996., IEEE 1996; Apr. 22-26, 1996 pp.:689-696; Digital Object Identifier 10.1109/PLANS. 1996.509146.*
Miltope Receives $13.5 Million Order for SPORT, Jan. 25, 2000, Montgomery AL.
Computer Diagnoses Vehicle Deficiencies, Sgt. Shawn Woodard, Fort Jackson Leader, Jul. 26, 2002, pp. 1-2.
SPORT Ad and Technical Specifications Sheet; Miltope Corporation, 2 pages.
Miltope Receives $16 Million Defense System Integration Award, PRNewswire, Mar. 26, 2000.
STE/ICE-R Design Guide for Vehicle Diagnostic Connector Assemblies, Report No. CR-82-588-003 REV 1 Feb. 1988.
J. S. Mussaf, "The Space Shuttle Clickable Map", Internet Apr. 1, 2001 (XP002235111); Retrieved from the Internet:: http://web.archive.org/web/2001040101.
Annex to Form PCT/ISA/206 Communication Relating to the Results of the Partial International Search; International Application No. PCT/US/02/40760; mailed Oct. 13, 2003.
'Products—Overview'; "Overview—The Right Stuff for 25 Years"; 2-pg. document; © 2001, Cadec Corporation; webmaster@cadec.com; [printed from Internet www.cadecorp.com/products/index.htm]; [Page dated Aug. 8, 2001].
'Interests'; "Global Remote Asset Monitoring"; 2-pg. document; © 2000 MobileNet; [printed from Internet www.mobile-net.com/inside.htm]; [Page dated Aug. 8, 2001].
'Top 100'; "Construction Equipment's editors pick the 100 most significant product introductions of the year"; 1-pg. document; Construction Equipment Magazine, Dec. 1999 issue; © 2000 MobileNet; [printed from Internet www.mobile-net.com/top100.htm]; [Page dated Aug. 8, 2001].
Griffin, Jeff; 'Rental'; "Look up in the sky . . . it's . . . it's a . . . fleet management satellite!"; 4-pg. document; © 2000 American Rental Association; © 2000 MobileNet; [printed from Internet www.mobile-net.com/rental.htm]; [Page dated Aug. 8, 2001].
'Vermeer Deal'; Nov. 1, 1999 Press Release (Alpharetta, GA) entitled "MobileNet asset monitoring system selected by Vermeer Manufacturing Company"; 2-pg. document; © 2000 MobileNet; [printed from Internet www.mobile-net.com/vermeersignson.htm]; [Page dated Aug. 8, 2001].
'Customer Applications'; "Benefits of Monitoring and Tracking of Heavy Equipment:"; 2-pg. document; © 2000 MobileNet; [printed from Internet www.mobile-net.com/custapp.htm]; [Page dated Aug. 8, 2001].
'Construction'; "Equipment Tracking-A New Asset Management Method"; 3-pg. document; Equipment Today, Oct. 1999 issue; © 2000 MobileNet; [printed from Internet www.mobile-net.com/conequip.htm]; [Page dated Aug. 8, 2001].
'MobilEmail'; "MobileNet MobilEmail"; 2-pg. document; © 2000 MobileNet; [printed from Internet www.mobile-net.com/memail.htm]; [Page dated Aug. 8, 2001].
'Products'; "MobileNet products"; 2-pg. document; © 2000 MobileNet; [printed from Internet www.mobile-net.com/products.htm]; [Page dated Aug. 8, 2001].
'TrakPak 2000'; "The TrakPak 2000—A Self-Contained Mobile Tracking Unit"; 2-pg. document; © 2000 MobileNet; [printed from Internet www.mobile-net.com/prod02.htm]; [Page dated Aug. 8, 2001].
'Mobile Workstation'; "MobileNet Mobile Workstation"; 2-pg. document; © 2000 MobileNet; [printed from Internet www.mobile-net.com/prod01.htm]; [Page dated Aug. 8, 2001].
'FAQ'; "Global Asset Monitoring"; 2-pg. document; © 1999 MobileNet; [printed from Internet www.mobile-net.com/faq.htm]; [Page dated Aug. 8, 2001].
'HGI Wireless Inc. HGI Wireless Products and Services'; "Products and Services"; 2-pg. document; © 2001 HGI Wireless Inc.; [printed from Internet www.hgiwireless.com/products_summary.html]; [Page dated Aug. 8, 2001].
'Products—CMS Products'; "CMS Products"; 6-pg. document; © 2001, Cadec Corporation; [printed from Internet www.cadeccorp.com/products/cms_products.htm]; [Page dated Aug. 8, 2001].
'Products—Mobius TTS'; "Mobius TTS".; 3-pg. document; © 2001, Cadec Corporation, [printed from Internet www.cadeccorp.com/products/mobius.htm]; [Page dated Aug. 8, 2001].
'Products—Mobius TTS'; "Mobius TTS / Onboard Computer"; 2-pg. document; © 2001, Cadec Corporation, [printed from Internet www.cadeccorp.com/products/obc.htm]; [Page dated Aug. 8, 2001].
"Onboard Computer—Mobius TTS™ Smarter Mobile Logistics on the Road"; 4-pg. document; Cadec Corporation, Londonderry, NH; www.cadec.com.
'Welcome to Modular Mining Systems, Inc.—Products'; "Products—Vehicle Health System (VHS)"; 1-pg. document; [printed from Internet www.mmsi.com/modular/products/vhs/]; [Page dated Aug. 8, 2001].
'Welcome to Modular Mining Systems, Inc.—Products'; "Products—Dispatch® Systems for Open Pit Mines"; 1-pg. document; [printed from Internet www.mmsi.com/modular/products/openpit/]; [Page dated Aug. 8, 2001].
Technology Products—MineStar; "Minestar"; 2-pg. document; © Caterpillar; [printed from Internet www.caterpillar.com/products/shared/technology_products/01_prod]; [Page dated Aug. 8, 2001].
'Caterpillar'; "Technology Products"; 2-pg. document; © Caterpillar; [printed from Internet www.caterpillar.com/products/shared/technology_products/01_prod]; [Page dated Aug. 8, 2001].
'Technology Products—VIMS'; "Technology Products"; 2-pg. document; © Caterpillar; [printed from Internet www.caterpillar.com/products/shared/technology_products/01_prod]; [Page dated Aug. 8, 2001].
'Trimble information Services'; "Trimble Information Services Powering the Transformation of Location Data . . . into Location Information"; 4-pg. document; [printed from Internet www.trimble.com/griddata/wp_trimble.htm]; [Page dated Aug. 8, 2001].
'AssetVision Brochure'; "AssetVision Brochure"; 3-pg. document; [printed from Internet www.csiwireless.ca/products/product_subfiles/assetvision_brochure]; [Page dated Aug. 8, 2001].

"AssetVision™ Product Specification"; Wireless Link; 63-pg. document; Revision Date: May 18, 1999.

'I.D. Systems / Products Gallery'; "The I.D. Systems Product Gallery"; 3-pg. document; © *I.D. Systems, Inc.*; [printed from Internet www.id-systems.com/products_gallery.html]; [Page dated Aug. 8, 2001].

'Wireless Link Corporation—News Room'; Jan. 9, 2001 Press Release (Calgary, Alberta) entitled "CSI Wireless Receives $7M Order from InterTrak"; 3-pg. document; [printed from Internet www.wireless-link.com/html/jan92001.html]; [Page dated Aug. 8, 2001].

'IBM Press room'; Jun. 26, 2001 Press Release (White Plains, NY) entitled "IBM ServiceAfterSales Solutions Open Lucrative New Customer Service Markets For Manufacturers And Service Organizations"; 2-pg. document; [printed from Internet www.ibm.com/press/prnews.nsf/Print/5E98EA82D18E933385256A77]; [Page dated Aug. 8, 2001].

'Home Page'; "An Introduction to InterTrak"; 3-pg. document; © *2001 InterTrak Tracking Services, LLC.*; [printed from Internet www.trackmenow.com/bottom.htm]; [Page dated Aug. 8, 2001].

'Introduction'; (Re: WDF Primer; 6-pg. document; [printed from Internet www.wispinc.com/Faq/primer.htm]; [Page dated Aug. 8, 2001], p. 3 is missing.

'Nissan Motor Phils., Inc.'; RADIX Systems Service Corporation; Client: Nissan Motor Philippines, Inc.; Project: Design, Development and Implementation of a Corporate Information System; 1-pg. document; © *2000 RADIX Systems Services Corp.*; [printed from Internet www.radixsys.com/nmpi.htm]; [Page dated Aug. 8, 2001].

Aircraft Internal Time Division Multiplex Data Bus, MILnSTD-1553(USAF); 29 pgs.; (Aug. 30, 1973).

"Dana Spicer Central Tire Inflation System Specifications," Dana Coporation, Kallamazoo, Michigan, May 2000 (2pgs.).

"HEMTT - Heavy Expanded Mobility Tactical Truck M977 Series Truck"; 12-page (as photocopied) brochure; Product of Oshkosh Truck Corporation; (Apr. 2000).

"LHS Decontamination Mission Module"; 2-page (as photocopied) brochure; Product of Oshkosh Truck Coporation.

"LVS - Logistic Vehicle System (MK48 Series)"; 6-page document; Product of Oshkosh Truck Corporation.

"M1070F Heavy Equipment Transporter & Trailer"; 8-page (as photocopied0 brochure; Product of Oshkosh Truck Corporation; (Sep. 2001).

"M1977 CBT (Common Bridge Transporter)"; 2-page (as photocopied) brochure; Product of Oshkosh Truck Corporation.

"Medium Tactile Vehicle Replacement"; 6-page (as photocopied) brochure; Product of Oshkosh Truck Corporation; (Aug. 2000).

Miltope Receives $16 Million Defense System Integration Award, PRNewswire, Mar. 26, 2000.

"MTVR Dump Body Varient (Medium Tactical Vehicle Replacement)"; 2-page (as photocopied) brochure; Product of Oshkosh Truck Corporation; (Sep. 2001).

"MTVR Wrecker Varient (MK36 Wrecker Recovery Vehicle)"; 2-page (as photocopied) brochure; Product of Oshkosh Truck Corporation; (Sep. 2001).

"Oshkosh Trucks - 75 Years of Specialty Truck Production"; Wright et al.; (pp. 119-126); Motorbooks International Publishers & Wholesalers (1992).

"Oshkosh Demonstrates ProPulse, the First Electric Hybrid - Drive Heavy Defense Truck," Oshkosh Truck Corp., Feb. 27, 2000 (2 pages).

"Oshkosh Recieves Federal Government Funding to Develop ProPulse Alternative Drive System for Military Trucks," Oshkosh Truck Corp., Aug. 31, 2001 (2 pages).

"Oshkosh Showcases ProPulse Hybrid Electric System at Major Defense Exhibition," Oshkosh Truck Corp., Oct. 21, 2002 (1 page).

"Oshkosh Truck and Ohio State University Design Robotic Vehicle to Compete in Desert Race," Oshkosh Truck Corp., Feb. 11, 2004 (2 pages).

"Oshkosh Truck Awarded Contract for U.S. Army Future Tactical Truck Concepts and Technology Evaluations," Oshkosh Truck Corp., Dec. 2, 2003 (2 pages).

"Oshkosh Truck Rolls Out Next Generation of Command Zone Advanced Electronics System to Military Market," Oshkosh Truck Corp., Oct. 21, 2002 (2 pages).

"Oshkosh Truck's Robotic Truck Qualifies for Pentagon's $1 Million Desert Race," Oshkosh Truck Corp., Mar. 12, 2004 (2 pages).

"Palletized Load System (PLS) - Concrete Mobile Mixer Module"; 2-page (as photocopied) brochure; Product of Oshkosh Truck Corpration.

"Palletized Load System (PLS) - PLS Potable Water Distributor Module"; 2-page (as photocopied) brochure; Product of Oshkosh Truck Corporation.

"The One to Count on Through Hell and High Water"; 4-page (as photocopied) brochure; Product of Oshkosh Truck Corporation; (Sep. 2000).

International Search Report and Written Opinion, PCT/US2004/031216, Oct. 31, 2005 (12 pgs).

"Oshkosh Demonstrates ProPulse, the First Electric Hybrid - Drive Heavy Defense Truck," Oshkosh Truck Corp., Feb. 27, 2000 (2 pages).

Pierce, We Build Confidence.®, "Command Zone™ Electronics Training Manual," Pierce Manufacturing Inc., Cahpter One - Chapter Ten; References 1-34, 162 pages.

Pierce, "PMC-IV System, 'Pierce Information Center' (PIC), Functional Plan for EB166/FDIC," Wilkinson/Kempen, 21 pages.

"Advanced Wireless Technology for CAN and DeviceNet," Apr. 2003 (1 pg.).

Annex to Form PCT-ISA-206 Communication Relating to the Results of the Partial International Search; International Application No. PCT-US-02-40760; mailed Oct. 13, 2003 (2 pgs.).

"AssetVision Brochure," printed on Aug. 8, 2001 (3 pgs.).

"AssetVision Product Specification," Wireless Link, Revision Date: May 18, 1999 (63 pgs).

Barraco Klement, M.A.; "Agile Support Project - Global Hawk Program," Jan.-Feb. 1999, pp. 66-70 (5 pgs.).

"CarPort - The Only Link Between the Auto and the PC," Vetronix Corporation, printed on Jul. 30, 2003 (p. 1).

"CarPort User's Guide Version 1.0," Vetronix Corporation, Nov. 1999 (40 pgs.).

Caterpillar, "Technology Products," printed on Aug. 8, 2001 (2 pgs.).

Computer Diagnoses Vehicle Deficiencies, Sgt. Shawn Woodard, Fort Jackson Leader, Jul. 26, 2002 (2 pgs.).

Construction, "Equipment Tracking-A New Asset Management Method", Equipment Today, Oct. 1999 (3 pgs.).

Correspondence from European Patent Office regarding Patent Application No. 04816888.4 - Europe, dated Oct. 26, 2007 (3 pgs.).

Correspondence from Sonn & Partner regarding Patent Application No. 04816888.4 - Europe, dated Oct. 31, 2007 (4 pgs.).

Customer Applications, "Benefits of Monitoring and Tracking of Heavy Equipment:" MobileNet; printed on Aug. 8, 2001, marked as copyright 2000 (2 pgs.).

Dearborn Group Technology; Controller Area Network and In-Vehicle Networking Technology; "Dearborn Group Puts Wireless Vehicle Connectiveity In Customers' Hands"; printed from website http:--www.dgtech.com-press-pr_sae2001_jag_demo.phtml; Mar. 3, 2001 (3 pgs.).

Dick Smith and Russ Walker; "Coming to a multiplex near you"; WasteAge.com; Fire Chief, Feb. 1, 2003 (5 pgs.).

DriverTech - Features, DriverTech, Inc., printed on Jul. 29, 2003 (1 pg.).

DriverTech - Functional Specifications, DriverTech Inc., printed on Jul. 29, 2003 (5 pgs.).

DriverTech - Hardware & Software, DriverTech, Inc., printed on Jul. 29, 2003 (3 pgs.).

DriverTech - Wireless IP-Based Fleet Management System, DriverTech, Inc., printed on Jul. 29, 2003 (2 pgs.).

FAQ, "Global Asset Monitoring, " MobileNet; printed on Aug. 8, 2001, copyright marked as 1999 (2 pgs.).

Griffin, Jeff, Rental, "Look, up in the sky . . . it's . . . its's a . . . fleet management satellite!" American Rental Association, MobileNet , Printed on Aug. 8, 2001, copyright marked 2000 (4 pgs.).

HGI Wireless Inc. HGI Wireless Products and Services, "Product and Services," HGI Wireless Inc.; printed on Aug. Aug. 8, 2001, copyright marked 2001 (2 pgs.).

Home Page, "An Introduction to InterTrak," InterTrak Tracking Services, LLC., printed on Aug. 8, 2001 copyright marked as 2001 (3 pgs.).

I.D. Systems I Products Gallery, "The I.D. Systems Products Gallery," I.D. Systems, Inc., printed on Aug. 8, 2001 (3 pgs.).
IBM Press room, "IBM ServiceAfterSales Solutions Open Lucrative New Customer Service Markets For Manufacturers and Service Organizations," Press Release, White Plains, NY, Jun. 26, 2001 (2 pgs.).
Interests, "Global Remote Asset Monitoring," MobileNet, printed on Aug. 8, 2001, copyright marked 2000 (2 pgs.).
Introduction, printed on Aug. 8, 2001 (7 pgs.).
J.S. Mussaf.; "The Space Shuttle Clickable Map", Internet Apr. 1, 2001 (XP002235111); Retrieved from the Internet; http:--web.archive.org-web-2001040101, Apr. 1, 2001 (24 pgs.).
Luka, J and Stubhan, F, "Mobile Diagnosis," Vehicle Electronics Conference, 1999 (IVEC 99), proceedings of the IEEE International Changchun, China, Sep. 6-9, 1999 (6 pgs.).
Miltope Recieves $13.5 Million Order for SPORT, Montgomery, AL, Jan. 25, 2000 (1 pg.).
Mobile Workstation, "MobileNet Mobile Workstation," printed on Aug. 8, 2001, copyright marked 2000 (2 pgs.).
MobilEmail, "MobileNet MobilEmail," printed on Aug. 8, 2001, copyright marked 2000 (2 pgs.).
Nathanson M., "Vehicle Intelligence and Remote Wireless OBD," SAE Technical Paper Dec. 4-6, 2000 (15 pgs.).
Nissan Motor Phils., Inc., "Client: Nissan Motor Philippines, Inc. Project," RADIX Systems Service Corporation, printed on Aug. 8, 2001, copyright marked 2000 (1 pg.).
"Onboard Computer - Mobius TTS Smarter Mobile Logistics on the Road," Cadec Corporation, Londonderry, NH, estimated date obtained of Aug. 8, 2001 (4 pgs.).
Products - CMS Products, "CMS Products," Cadec Corporation, printed on Aug. 8 2001, copyright marked 2001 (6 pgs.).
Products - Mobius TTS, "Mobius TTS - Onboard Computer," Cadec Corporation, printed on Aug. 8, 2001 (2 pgs.).
Products - Mobius TTS, "Mobius TTS," Cadec Corporation Corporation, printed on Aug. 8, 2001, copyright marked 2001 (3 pgs.).
Products - Overview, "Overview - The Right Stuff for 25 Years," Cadec Corporation, printed on Aug. 8, 2001, copyright marked 2001 (2 pgs.).
Products, "MobileNet Products," printed on Aug. 8, 2001, copyright marked 2000 (2 pgs.).
Reitzner, S. and Schleicher M.; 3SOFT GmbH, Erlangen-Germany; "Options and risks - PDAs in the automotive area"; Embedded Windows; ECE, Aug. 2001 (3 pgs.).
RM CANview Bluetooth-TCP-IP, RM Michaelides Software & Electronic Corp., Nov. 19, 2002 (2 pgs.).
Skibinski, J. et al., "Internet-based Vehicle Communication Network," SAE Technical Paper Series, Dec. 4-6, 2000 (8 pgs.).
SPORT Ad and Technical Specifications Sheet, Miltope Corporation, see IDS for date information (2 pgs.).
STE-ICE-R Design Guide for Vehicle Diagnostic Connector Assemblies, Report No. CR-82-588-003 REV 1, Feb. 1988 (182 pgs.).
Technology Products - MineStar, "Minestar," Caterpillar, printed on Aug. 8, 2001 (2 pgs.).
Technology Products - VIMS, "Technology Products," Caterpillar, printed on Aug. 8, 2001 (2 pgs.).
Telematics Diagram, Vetronix Corporation, printed on Jul. 30, 2003 (1 pg.).
"Televisant Fleet Management - The Concrete Solution," Trimble Navigation Limited, Mar. 2002 (2 pgs.).
"Televisant Ready Mix Industry Plan: maximize your ready mix fleet operation," 2003 (2 pgs.).
Top 100, "Construction Equipment's editors pick the 100 most significant product introductions of the year" Construction Equipment Magazine, Dec. 1999 (1 pg.).
TrakPak2000, "The TrakPak 2000 - A Self-Contained Mobile Tracking Unit," printed on Aug. 8, 2001, copyright marked 2000 (2 pgs.).
"Trimble and McNeilus Enhance Televisant Fleet Management System for the Ready Mix Market," Feb. 4, 2003 (2 pgs.).
Trimble and McNeilus Form Alliance to Factory-Install Fleet Management Solutions on Ready Mix Concrete Trucks, Mar. 19, 2002 (2 pgs.).
Trimble Information Services, "Trimble Information Services Power the Transformation of Location Data . . . into Location Information," printed on Aug. 8, 2001 (4 pgs.).
"Vehicle Internet Port (VIP) - Internet Access System for AutoPC," Vetronix Corporation, printed on Jul. 30, 2003 (1 pg.).
"Vehicle Internet Port (VIP) System Description," Vetronix Corporation, printed on Jul. 30, 2003 (2 pgs.).
Vermeer Deal, "MobileNet asset monitoring system selected by Vermeer Manufacturing Company," Alpharetta, CA, Nov. 1, 1999 (2 pgs.).
Welcome to Modular Mining Systems, Inc.-Products, "Products - Dispatch Systems for Open Pit Mines", Aug. 8, 2001, Copyright Marked 1996-2001 (1 pg.).
Welcome to Modular Mining Systems, Inc. - Products, "Products - Vehicle Health Systems (VHS)," printed Aug. 8, 2001 ( 1 pg.).
Wireless CAN Bridge CB-300, Matric, Apr. 10, 2002 (20 pgs.).
Wirless Link Corporation - News Room, "CSI Wireless Recieves $7M Order from InterTrak," Jan. 9, 2001 (3 pgs.).
"WirelessRoad Fleet Management System," Vetronix Corporation, printed on Jul. 30, 2003 (2 pgs.).
"WirelessRoad Frequently Asked Questions," Vetronix Corporation, printed on Jul. 30, 2003 (2 pgs.).
"WirelessRoad System Description," Vetronix Corporation, printed on Jul. 30, 2003 (5 pgs.).

* cited by examiner

EQUIPMENT SERVICE VEHICLE HAVING ON-BOARD DIAGNOSTIC SYSTEM

CROSS-REFERENCE TO RELATED APPLICATION

This application is a continuation of U.S. Ser. No. 09/500,506, filed Feb. 9, 2000, now U.S. Pat. No. 6,553,290, issued Apr. 22, 2003, hereby incorporated by reference.

FIELD OF THE INVENTION

This invention relates to diagnostic systems for equipment service vehicles. In particular, this invention relates to an on-board diagnostic system for equipment service vehicles.

DESCRIPTION OF RELATED ART

Modern vehicles have become increasingly complex and difficult to maintain. In order to enable more efficient vehicle maintenance, it is desirable to be able to accurately diagnose malfunctioning subsystems, such as engine systems, transmission systems, and so on, as well as specific vehicle components. When a malfunction is not properly diagnosed, the result is typically that parts which are fully operational are repaired or replaced, that parts which are repairable are replaced, and/or that parts which are not fully operational are not repaired or replaced. Accurate diagnoses therefore allow more efficient vehicle maintenance by avoiding unnecessary repairs and replacements, and by enabling necessary repairs and replacements to be made.

It is known to provide electronic diagnostic systems to aid in the accurate diagnoses of vehicle malfunctions. Government Report No. CR-82-588-003, entitled "STE/ICE-R Design Guide For Vehicle Diagnostic Connector Assemblies," February 1988, describes a diagnostic system used in connection with military vehicles. According to the approach described in this document, a military vehicle is provided with numerous sensors that are located throughout the vehicle and each of which obtains information pertaining to the health and operation of a subsystem of the vehicle. The sensors are used to measure typical parameters of interest such as engine RPM, engine temperature, fuel pressure, and so on. The sensors are connected by way of vehicle wiring to a common connector assembly. Diagnostic equipment provided at a maintenance depot is then capable of connecting to the various sensors by way of the connector assembly. At the maintenance depot, the diagnostic equipment can be utilized to perform tests on the vehicle to aid pinpointing the source of vehicle system malfunction.

In this arrangement, the sensors that are used by the diagnostic system are used exclusively by the diagnostic equipment at the maintenance depot, and not by other systems during normal operation of the vehicle. Additionally, in this arrangement, the connector assembly defines a hardwired analog interface between the sensors and the diagnostic equipment, and the diagnostic equipment expects signals appearing at given pins of the connector assembly to have predefined signal characteristics that are unique to the sensor utilized.

This approach suffers several disadvantages. First, this approach is expensive to implement because it requires numerous sensors above and beyond those required for normal operation of the vehicle. Additionally, the required sensors typically have unique signal characteristics that are specifically matched to the diagnostic equipment, and therefore the sensors are specialty items that are more expensive and not commonly available.

Second, this approach results in a diagnostic system with an unduly limited capability to accurately diagnose system faults. The capabilities of the diagnostic system are limited by the fact that the diagnostic system only utilizes information that is available from the diagnostic system sensors and not from other sources of information available on-board the vehicle. Therefore, the number of different types of information that can be obtained is limited to the number of diagnostic system sensors utilized. Further, because the sensors that are utilized tend to be specialty items as previously noted, they often do not incorporate the latest advances in sensor technology that provide performance/durability improvements over earlier sensor technologies. This further limits the accuracy of the diagnostic system as compared to that which could otherwise be achieved.

Finally, this approach is unduly cumbersome to utilize. As previously noted, the diagnostic equipment is provided at a maintenance depot and not on-board the vehicle. Therefore, in order to have a vehicle malfunction diagnosed, the vehicle must be brought to the maintenance depot. This requirement is inconvenient and limits the potential for field servicing of vehicles to minimize the amount of time that the vehicle is out of service for maintenance reasons.

SUMMARY OF THE INVENTION

According to a first preferred embodiment, an equipment service vehicle comprises a network communication link, a plurality of vehicle subsystems, a test control module, and an operator interface. Each vehicle subsystem comprises a mechanical system and an electronic control system that controls the mechanical system. Each respective electronic control system is connected to the network communication link and transmits information pertaining to the health and operation of the mechanical system on the network communication link. The test control module is mounted on board the vehicle and is coupled to the plurality of vehicle subsystems by way of the network communication link. The test control module is programmed to acquire at least some of the information pertaining to the health and operation of the mechanical system. The operator interface is mounted on board the vehicle and is coupled to the test control module. The operator interface comprises a display that displays a menu of test options to an operator and an input device that receives an operator input indicative of a menu selection made by the operator. The menu selection indicates a test selected by the operator. At least some of the information pertaining to the health and operation of the mechanical system, including results of the test, are displayed to the operator.

According to a second preferred embodiment, a method of diagnosing a fault on an equipment service vehicle is provided. The method comprises displaying a plurality of test options to an operator using an operator interface that is mounted on the vehicle. The method also comprises receiving an operator input using the operator interface, the input being indicative of a selection made by the operator and indicating a test selected by the operator. The method also comprises performing the selected test on the vehicle in response to the operator input, including communicating information pertaining to the health and operation of a vehicle subsystem from a control system for the vehicle subsystem to the operator interface by way of a network communication link. The method also comprises transmitting information pertaining to health and operation of a vehicle subsystem from an electronic control system for the subsystem to the operator interface by way of a network communication link. The method also comprises displaying results of the test to the operator using the operator interface.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Figure 1:
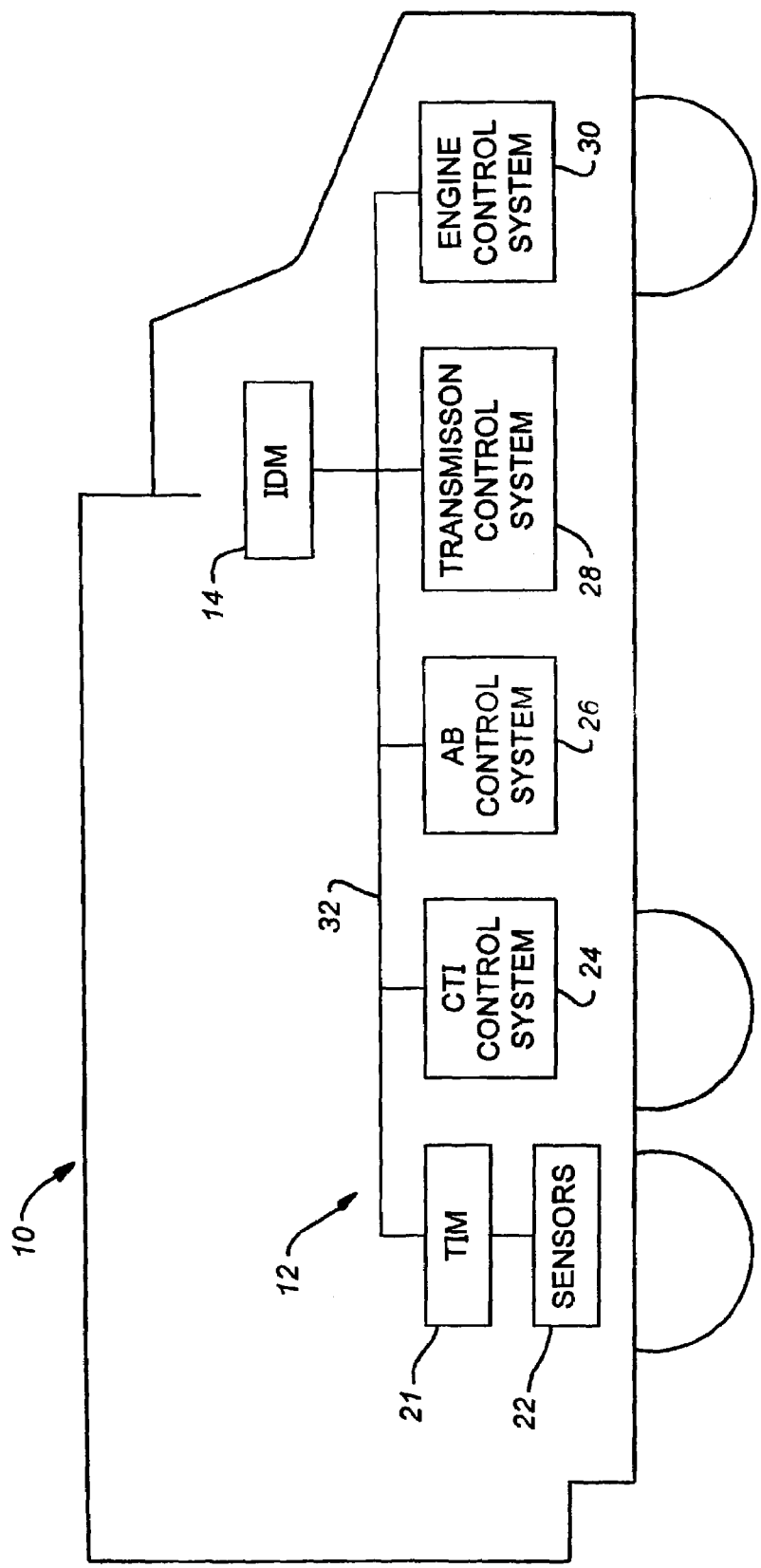
FIG. 1 is a schematic view of a military vehicle having a diagnostic system according to one embodiment of the present invention.

Referring now to FIG. 1, a preferred embodiment of an equipment service vehicle 10 having a diagnostic system 12 according to an embodiment of the invention is illustrated. By way of overview, the diagnostic system 12 comprises an intelligent display module 14, a test interface module 21 connected to a plurality of sensors 22, and a plurality of additional vehicle control systems 24–30. The intelligent display module 14, the test interface module 21, and the plurality of additional vehicle control systems 24–30 are interconnected with each other by way of a network communication link 32.

More specifically, the vehicle 10 is a military vehicle and, in particular, a medium tactical vehicle. However, it should be understood that the diagnostic system 12 of FIG. 1 could also be used with other types of military vehicles. For example, the diagnostic system 12 could be used in connection with heavy equipment transporter vehicles, which are used to transport battle tanks, fighting and recovery vehicles, self-propelled howitzers, construction equipment and other types of equipment. These types of vehicles are useable on primary, secondary, and unimproved roads and trails, and are able to transport in excess of 100,000 pounds or even in the range of 200,000 pounds or more. The diagnostic system 12 can also be used in connection with palletized load transport vehicles, in which a mobile truck and trailer form a self-contained system capable of loading and unloading a wide range of cargo without the need for forklifts or other material handling equipment. Such trucks are provided with a demountable cargo bed and a hydraulically powered arm with a hook that lifts the cargo bed on or off the truck. These trucks may be also provided with a crane to drop off the pallets individually if the entire load is not needed. Further, the diagnostic system 12 can also be used in connection with trucks designed for carrying payloads for cross country military missions. Such trucks may include, for example, cargo trucks, tractors, fuel servicing trucks, portable water trucks, and recovery vehicles (with crane and winch). Such trucks are capable of passing through water crossings three or four or more feet deep. These trucks can also be used for missile transports/launchers, resupply of fueled artillery ammunition and forward area rearm vehicles, refueling of tracked and wheeled vehicles and helicopters, and recovery of disabled wheeled and tracked vehicles. The diagnostic system 12 can be used in connection with a wide range of other military vehicles as well.

The intelligent display module 14 provides an operator interface to the diagnostic system 12 and also provides intelligence used to conduct diagnostic tests and other services. In particular, the intelligent display module 14 includes a test control module 15 (which further includes a microprocessor 16 and a diagnostic program 17) and an operator interface 18 (which further includes a display 19 and a keypad 20) (see FIG. 2).

In the preferred embodiment, the test control module 15 and the operator interface 18 are provided as a single, integrated unit (namely, the intelligent display module 14) and share the same housing as well as at least some of the internal electronics. Other arrangements are possible, however. For example, as can be easily imagined, it would also be possible to provide the test control module 15 and the operator interface 18 in the form of separate physical units, although this arrangement is not preferred for reasons of increased cost and parts count. Both the test control module 15 and the operator interface 18 can be obtained in the form of a single, integrated unit from Advanced Technology, Inc., Elkhart, Ind. 46517. This product provides a generic flat panel 4 line×20 character display 19, four button keypad 20, microprocessor 16, and memory that is capable of being programmed with a program (such as the diagnostic program 17) to customize the intelligent display module for a particular application. Of course, a more (or less) elaborate intelligent display module could also be utilized.

Also in the preferred embodiment, the intelligent display module 14 is semi-permanently mounted within the vehicle 10. By semi-permanently mounted, it is meant that the intelligent display module 14 is mounted within the vehicle 10 in a manner that is sufficiently rugged to withstand normal operation of the vehicle for extended periods of time (at least days or weeks) and still remain operational. However, that is not to say that the intelligent display module 14 is mounted such that it can never be removed (e.g., for servicing of the intelligent display module) without significantly degrading the structural integrity of the mounting structure employed to mount the intelligent display module 14 to the remainder of the vehicle 10. The intelligent display module 14 is preferably mounted in an operator compartment of the vehicle 10, for example, in a storage compartment within the operator compartment or on an operator panel provided on the dashboard.

The operation of the test control module 15, and in particular of the microprocessor 16 to execute the diagnostic program 17, is shown and described in greater detail below in conjunction with the flow chart of FIG. 4. In general, the microprocessor 16 executes the diagnostic program 17 to diagnose subsystem faults, to display fault information, to maintain vehicle maintenance records, and to perform data logging for system diagnosis and/or for accident reconstruction. Depending on the application, it may be desirable to incorporate additional services as well, or to incorporate fewer than all of these services.

The operator interface 18 includes the display 19 which is used to communicate (and, in particular, to display) information to the operator. For example, the display 19 is used to prompt the operator to enter information into the keypad 20, or to take certain actions with respect to the vehicle during testing (e.g., bring the engine to a specified RPM level). The display 19 is also used to display a menu or series of menus to allow the operator to select a test to be performed or to select another service of the intelligent display module 14 to be utilized. The display 19 is also used to display status information during system startup and during testing, and to display any error messages that arise during system startup or during testing. The display 19 is also used to display input data and fault mode indicators from control systems 24–30, and any other information from additional vehicle subsystems. The display 19 is also used to display information from discrete sensors such as the sensors 22. The display 19 is also used to display the results of diagnostic tests that are performed (e.g., a pass/fail message or other message).

Preferably, the display 19 displays all of this information to the operator in a user-friendly format as opposed to in the form of codes that must be interpreted by reference to a separate test or service manual. This is achieved in straightforward fashion by storing in the memory of the intelligent display module 14 information of the type commonly published in such manuals to facilitate manual interpretation of such codes, and using this information to perform the translation automatically. Likewise, as previously noted, the display 19 is used to prompt the operator to take certain actions with respect to the vehicle during testing and to otherwise step the operator through any test procedures, without reference to a test manual. This allows the amount of operator training to be reduced.

The operator interface 18 also includes the keypad 20 which is used to accept or receive operator inputs. For example, the keypad 20 is used to allow the user to scroll through and otherwise navigate menus displayed by the display 19 (e.g., menus of possible tests to be performed on the vehicle 20), and to select menu items from those menus.

As previously noted, it would also be possible to utilize a more elaborate intelligent display module. For example, a more elaborate keypad 20 could be utilized if more data entry capability is desired. In this regard, however, it is noted that the intelligent display module 14 also preferably includes a communication port that allows the display module to communicate with a personal computer 33 by way of a communication link 36 (see FIG. 2). The personal computer 33 can be used to retrieve, manipulate and examine data stored within the intelligent display module 14. For example, if the intelligent display module 14 includes a data logger as described below, the personal computer can be used to retrieve and examine the information stored by the data logger. Likewise, if the intelligent display module 14 implements a vehicle maintenance jacket, the personal computer 33 can be used to retrieve and modify data stored in the vehicle maintenance jacket. Further, using the personal computer 33, it is possible to integrate the diagnostic system 12 with an interactive electronic technical manual (IETM), to allow the interactive electronic technical manual to access the data available from the diagnostic system 12.

The test interface module 21 accepts requests from the intelligent display module 14 for information from the sensors 22, retrieves the requested information from the respective sensor 22, converts input signals from the respective sensor 22 into a format that is compatible with the network communication link 32, and transmits the information from the respective sensor 22 to the intelligent display module 14 via the network communication link 32. The test interface module 21 is therefore preferably implemented as a passive unit with no standard broadcasts that burden the communication link 32. As a result, in operation, the test interface module 21 does not regularly transmit data on the network communication link 32. Rather, the test interface module 21 passively monitors the network communication link 32 for information requests directed to the interface module 21. When an information request is received, the test interface module 21 obtains the requested information from the relevant sensor 22, and then transmits the requested information on the network communication link 32 to the intelligent display module 14.

The test interface module 21 may, for example, include as many inputs as there are sensors 22. Each input may include associated switches for configuring the input, an analog-to-digital converter to convert analog signals to a digital format, and any other signal processing circuitry. The number of inputs is not important, since it is possible to use fewer test interface modules each with a larger number of inputs, or more test interface modules each with a smaller number of inputs. The number of inputs is not limited in any particular way and is determined by need.

In practice, the test interface module 21 may be a commercially available unit capable of putting information from discrete sensors onto a network communication link such as SAE (Society of Automotive Engineers) J1708. The test interface module 21 preferably also meets applicable standards for underhood installation, such as SAE J1455, to allow the test interface module to be located in close proximity to the sensors 22 to reduce wiring. The test interface module may, for example, be obtained from Advanced Technology Inc., Elkhart, Ind. 46517 (PN 3246282). Again, however, a wide range of devices of varying construction and complexity could be utilized to implement the test interface module 21.

Figure 2:
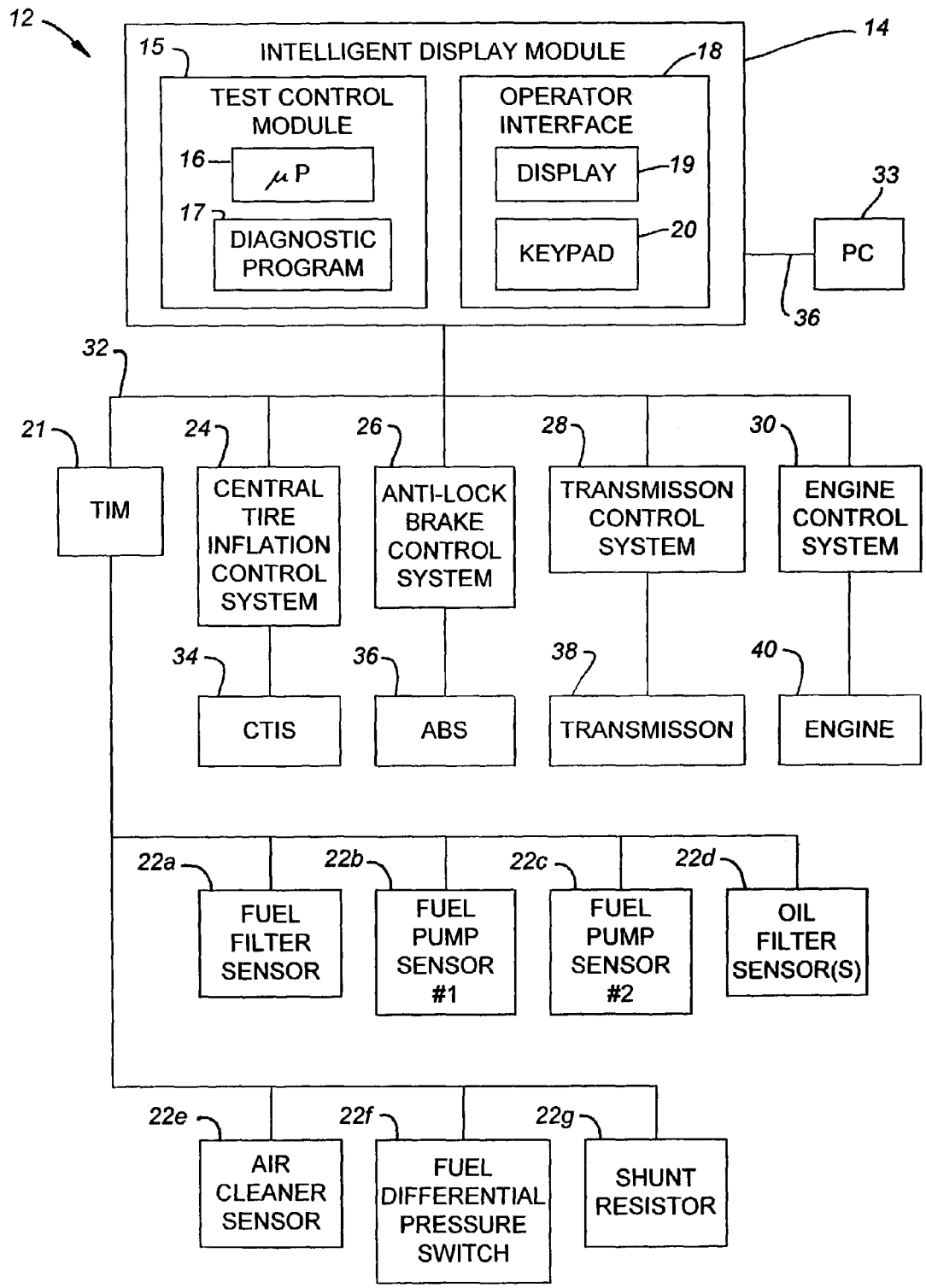
FIG. 2 is a block diagram of the diagnostic system of FIG. 1 showing selected aspects of the diagnostic system in greater detail.

The test interface module 21 is connected to the plurality of sensors 22 which are each capable of obtaining information pertaining to the health and operation of a vehicle subsystem. "Health" and "operation" are interrelated and information that pertains to one will, at least to some extent, pertain to the other as well. The sensors 22 are discrete sensors in the sense that they are not integrally provided with the control systems 24–30 and associated controlled mechanical systems (e.g., engine, transmission, and so on) 34–40. The sensors are add-on devices that are used only in connection with the intelligent display module 14. In general, discrete sensors are preferably only used when the information provided by the sensor is not otherwise available on the network communication link 32. In FIG. 2, the sensors 22 are shown to include a fuel filter inlet pressure sensor 22a, fuel pump outlet pressure sensor 22b, fuel return pressure sensor 22c, oil filter sensors 22d, an air cleaner pressure sensor 22e, a fuel differential pressure switch 22f, and a shunt resistor 22g (used to determine compression imbalance based on unequal current peaks in the starter current).

In addition to the intelligent display module 14 and the test interface module 21, the diagnostic system 12 also includes a plurality of additional vehicle control systems 24–30, as previously noted. As shown in FIG. 2, the control system 24 is a central tire inflation control system that controls a central tire inflation system (CTIS) 34, the control system 26 is an anti-lock brake control system that controls an anti-lock brake system (ABS) 36, the control system 28 is a transmission control system that controls a transmission 38, and the control system 30 is an engine control system that controls an engine 40. The vehicle subsystems formed by the mechanical systems 34–40 and associated control systems 24–30 are conventional and are chosen in accordance with the intended use of the vehicle 10.

The control systems 24–30 each store information pertaining to the health and operation of a respective controlled system. The control systems 24–30 are capable of being queried and, in response, making the requested information available on the network communication link 32. Because the vast amount of information required for performing most diagnostic tests of interest is available from the control systems 24–30 by way of the network communication link 32, it is possible to drastically reduce the number of discrete sensors 22 that are required. Thus, as just noted, discrete sensors are preferably only used when the information provided by the sensor is not otherwise available on the network communication link 32.

Typically, each of the control systems 24–30 comprises a microprocessor-based electronic control unit (ECU) that is connected to the network communication link 32. When the intelligent display module 14 requires status information pertaining to one of the mechanical systems 34–40, the intelligent display module 14 issues a request for the information to the respective one of the control systems 24–30. The respective control system then responds by making the requested information available on the network communication link 32.

Typical ECUs for transmission and engine control systems are capable of producing fault codes and transmitting the fault codes on the network communication link 32. Depending on the type of fault, the fault codes may be transmitted automatically or alternative only in response to a specific request for fault information. Typical ECUs for central tire inflation systems and anti-lock brake systems also transmit fault codes but, in most commercially available systems, fault codes are transmitted only in response to specific requests for fault information. When a fault code is transmitted on the network communication link 32, the intelligent display module 14 receives the fault codes from the network communication link 32, interprets the fault codes, and displays the interpreted fault codes to a human operator using the display 19.

Figure 3:
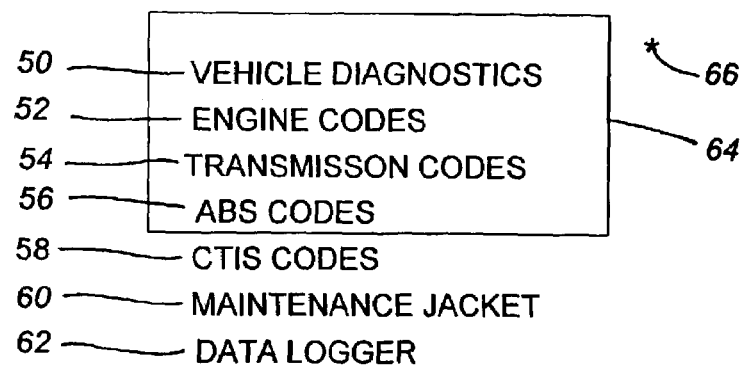
FIG. 3 is a menu displayed by a display of the diagnostic system of FIG. 1 showing various services offered by the diagnostic system.

Referring now to FIG. 3, in general, during operation, the display 19 displays menus to the operator and the keypad receives operator inputs used to navigate the menu, make menu selections, and begin testing. Assuming other services are also provided, the operator is first prompted to select an option from among a list of options that includes options of other services provided by the intelligent display module 14. The list of options may include, for example, an option 50 to perform vehicle diagnostic testing, an option 52 to view engine codes, an option 54 to view transmission codes, an option 56 to view ABS codes, an option 58 to view CTIS codes, an 60 option to view and/or modify data in the vehicle maintenance jacket, and an option 62 to view information stored in a data logger. Given that the display 19 is a four line display in the preferred embodiment, a vertically sliding winding 64 is used to scroll through the options, and the user presses a select button on the keypad 20 when a cursor 66 is positioned on the desired option. As previously noted, other options may also be provided.

Figure 4:
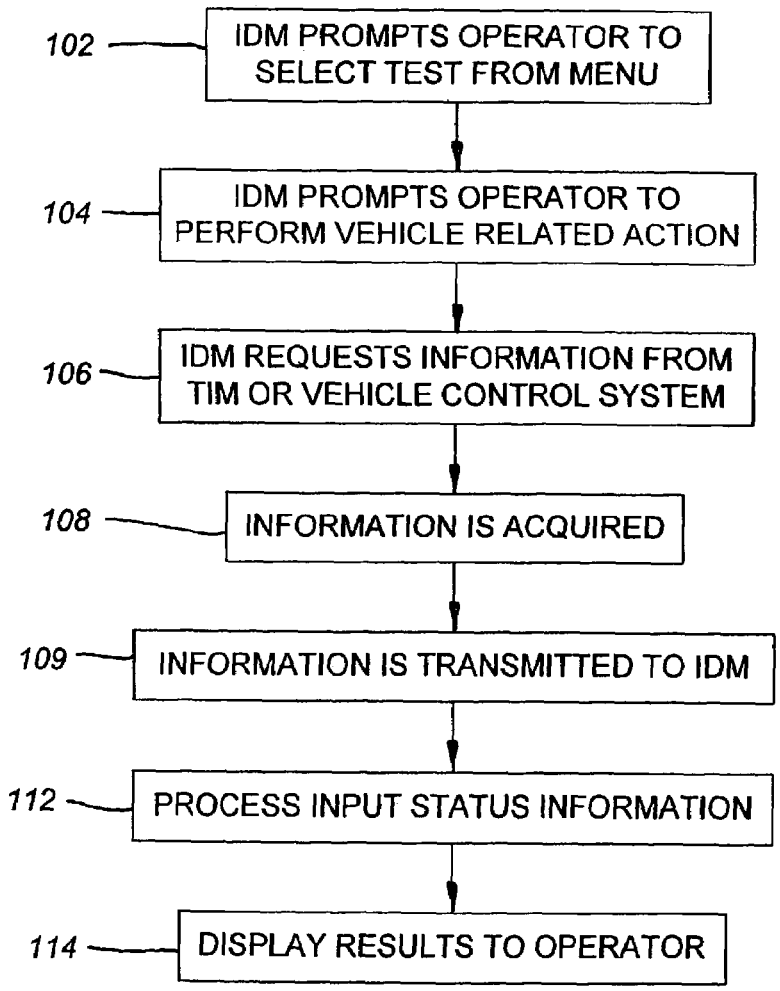
FIG. 4 is a flow chart showing the operation of the diagnostic system of FIG. 1 to perform a diagnostic test procedure.

Referring now to FIG. 4, a flow chart showing the operation of the diagnostic system of FIGS. 1–2 to perform a diagnostic test is illustrated. In connection with military vehicles, the diagnostic system 12 may for example be made capable of performing the following diagnostic tests, all of which provide information pertaining to the health and operation of the tested subsystem:

| Test | Test Description and Application | Exemplary Measurement Range(s) |
|---|---|---|
| ENGINE TESTS | | |
| Engine RPM (AVE) | Measures average speed of engine crankshaft. | 50–5000 RPM |
| Engine RPM, Cranking SI only | Measures cranking RPM. Performed with ignition ON. Inhibit spark plug firing allowing cranking without starting. | 50–1500 RPM |
| Power Test (RPM/SEC) | Measures engine's power producing potential in units of RPM/SEC. Used when programmed engine constants and corresponding Vehicle Identification Number (VID) have not been established. | 500–3500 RPM/s |
| Power Test (% Power) | Measures percentage of engine's power producing potential compared to full power of a new engine. | 0–100% |
| Compression Unbalance (%) | Evaluates relative cylinder compression and displays percent difference between the highest and the lowest compression values in an engine cycle. | 0–90% |
| IGNITION TESTS | | |
| Dwell Angle (TDC) | Measures number of degrees that the points are closed. | 10–72 @ 2000 RPM |
| Points Voltage (VDC) | Measures voltage drop across the points (points positive to battery return). | 0–2 VDC |
| Coil Primary | Measures voltage available at the coil positive terminal of the operating condition of the coil. | 0–32 VDC |
| FUEL/AIR SYSTEM TESTS | | |
| Fuel Supply Pressure (psi) | | 0–100 psi |
| Fuel Supply Pressure (psi) | This test measures the outlet pressure of the fuel pump. | 0–10 psi<br>0–30 psi<br>0–100 psi<br>0–300 psi |
| Fuel Return Pressure (psi) | Measures return pressure to detect return line blockage, leaks, or insufficient restrictor back pressure. | 0–100 psi |
| Fuel Filter Pressure Drop (PASS/FAIL) | Detects clogging via opening of a differential pressure switch across the secondary fuel filter. | PASS/FAIL |
| Fuel Solenoid Voltage (VDC) | Measures the voltage present at the fuel shutoff solenoid positive terminal. | 0–32 VDC |
| Air Cleaner Pressure Drop (RIGHT) (In H₂O) | Measures suction vacuum in air intake after the air cleaner relative to ambient air pressure to detect extent of air cleaner clogging. | 0–60 in. H₂O |
| Air Cleaner Pressure Drop (LEFT) (In H₂O) | Second air cleaner on dual intake systems. | 0–60 in. H₂O |
| Turbocharger Outlet Pressure (RIGHT) (In Hg) | Measures discharge pressure of the turbocharger. | 0–50 in. Hg |
| Turbocharger Outlet Pressure (LEFT) (In Hg) | Second turbocharger on dual intake systems. | 0–50 in. Hg |
| Airbox Pressure (In Hg) | Measures the airbox pressure of two stroke engines. This measurement is useful in detecting air | 0–20 in. Hg<br>0–50 in. Hg |

-continued

| Test | Test Description and Application | Exemplary Measurement Range(s) |
|---|---|---|
| | induction path obstructions or leaks. | |
| Intake Manifold Vacuum (In Hg) | Spark ignition engine intake system evaluation. | 0–30 in. Hg |
| Intake Manifold Vacuum Variation (In Hg) | Spark ignition engine intake system evaluation. | 0–30 in. Hg |
| LUBRICATION/COOLING SYSTEM TESTS | | |
| Engine Oil Pressure (psi) | Measures engine oil pressure. | 0–100 psi |
| Engine Oil Filter | Measures the pressure drop across the engine oil filter as indicator of filter element clogging. | 0–25 psi |
| Engine Oil Temperature (° F.) | Primarily applicable to air cooled engines. Requires transducer output shorting switch on vehicle to perform system zero offset test. | 120–300° F. |
| Engine Coolant Temperature (° F.) | Transducer output shorting switch on vehicle required. | 120–300° F. |
| STARTING/CHARGING SYSTEM TESTS | | |
| Battery Voltage (VDC) | Measure battery voltage at or near battery terminals. | 0–32 VDC |
| Starter Motor Voltage (VDC) | Measures the voltage present at the starter motor positive terminal. | 0–32 VDC |
| Starter Negative Cable Voltage Drop (VDC) | Measures voltage drop on starter path. A high voltage indicates excessive ground path resistance. | 0–2 VDC |
| Starter Solenoid Volts (VDC) | Measures voltage present at the starter solenoid's positive terminal. Measures current through battery ground path shunt. | 0–32 VDC |
| Starter Current, Average (amps) | Measures starter current. | 0–1000 A<br>0–2000 A |
| Starter Current First Peak (Peak Amps, DC) | Provides a good overall assessment of complete starting system. Tests condition of the starting circuit and battery's ability to deliver starting current. The measurement is made at the moment the starter is engaged and prior to armature movement. Peak currents less than nominal indicate relatively high resistance caused by poor connections, faulty wiring, or low battery voltage. | 0–1000 A<br>0–2000 A |
| Battery Internal Resistance (Milliohms) | Evaluate battery condition by measuring battery voltage and current simultaneously. | 0–999.9 mohm |
| Starter Circuit Resistance (Milliohms) | Measures the combined resistance of the starter circuit internal to the batteries. | 0–999.9 mohm |
| Battery Resistance Change (Milliohms/sec) | Measures rate of change of battery resistance as an indicator of battery condition. | 0–999.9 mohm/s |
| Battery Current | Measures current to or from the battery. | −999–1000 A<br>−999–2000 A |
| Battery Electrolyte Level (PASS/FAIL) | Determines whether electrolyte in the sensed cell is of sufficient level (i.e., in contact with electrolyte probe). | PASS/FAIL |
| Alternator/Generator Output Voltage (VDC) | Measures output voltage of generator/alternator. | 0*–32 VDC |
| Alternator/Generator Field Voltage (VDC) | Measures voltage present at alternator/generator field windings. | 0–32 VDC |
| Alternator/Generator Negative Cable Voltage Drop (VDC) | Measures voltage drop in ground cable and connection between alternator/generator ground terminal and battery negative terminal. | 0–2 VDC |
| Alternator Output Current Sense (VAC-RMS) | Measures voltage output at the current transformer in 650 ampere alternator. | 0–3 VAC |
| Alternator AC Voltage Sense (VAC-RMS) | Measures alternator output voltage. | 0–22 VAC |

In general, the specific diagnostic tests that are performed will be selected depending on the application, including the type of equipment utilized by the vehicle 10. Most or all tests may be simple in nature from a data acquisition standpoint, involving primarily bringing the vehicle to a particular operating condition (e.g., engine speed), if necessary, and obtaining information from a suitable transducer constructed and placed to measure the parameter of interest, although more elaborate tests could also be utilized. Any number of different vehicle parameters can be measured, each providing a separate data point regarding the operational health of the vehicle. By providing an operator with enough data points regarding the operational health of the vehicle, the operator can use this information in a known way to determine whether the vehicle is in good working order, or whether some subsystem or component thereof needs to be repaired or replaced.

At step 102, once the vehicle diagnostic option is selected, the display 19 displays a menu of various tests that are available to the operator, and the operator is prompted to select a test from the test menu. Again, the list of options may comprise dozens of options, such as some or all of those listed above, and/or tests other than those listed above, and the operator can scroll through the menu and selected the desired option.

At Step 104, the operator is prompted to perform a vehicle related action. This step, which may or may not be necessary depending on the type of test performed, may be used to prompt the operator to start the engine to develop fuel pressure, oil pressure, and so on, depending on which vehicle parameter is tested. For example, if it is desired to test the operational health of the battery, then the operator may be prompted to engage the starter for a predetermined amount of time to establish a current draw on the battery.

At Step 106, the intelligent display module 14 issues a request for information from the test interface module 21 and/or from one or more of the control systems 24–30. As previously noted, the test interface module 21 does not continually broadcast information on the network communication link 32, because the sensors 22 connected to the test interface module are used only for diagnostic testing and because presumably diagnostic testing will be performed only infrequently. Therefore, when the intelligent display module 14 needs information from one of the sensors 22 pursuant to a test requested to be performed by the operator at the operator interface 18, the intelligent display module 14 requests the test interface module 21 for this information.

Alternatively, the needed information may be of a type that is available from one of the control systems 24–30. The control systems 24–30 are not only able to acquire information from sensors located within the systems 34–40, but are also able to maintain information derived from sensors located within the systems 34–40. For example, the engine control system 30 may maintain information pertaining to the average RPM of the engine, which is a parameter that is not directly measurable but that can be easily calculated based on parameters that are directly measurable. Through the network communication link 32, all of this information is made available to the diagnostic system 12. When the intelligent display module 14 needs information from one of the control systems 24–30 pursuant to a test requested to be performed by the operator at the operator interface 18, the intelligent display module 14 requests the respective control system for this information.

At Step 108, the requested information is retrieved from one of the sensors 22 by the test interface module 21, or from memory or an internal sensor by the respective control system 24–30. At step 109, the information is transmitted from the test interface module 21 or from one of the control systems 24–30 to the intelligent display module 14 by way of the network communication link 32.

At step 112, the input status information is processed at the intelligent display module 14. For example, if fuel supply pressure is measured by one of the sensors 22, then the measured fuel supply pressure may be compared with upper and lower benchmark values to determine whether the fuel pressure is at an acceptable level, or whether it is too high or too low. Finally, at step 114, the results of the test are displayed to the operator.

As has been previously noted, in addition to performing diagnostic tests, the intelligent display module 14 can also be used to provide other services to an operator. For example, the intelligent display module 14 can be used to allow the operator to view engine codes, to view transmission codes, to view ABS codes, and to view CTIS codes. In practice, these services can be implemented simply by allowing acquiring the respective codes from the respective control system 24–30, and displaying the codes to the operator. Additionally, the control systems 24–30 may automatically transmit fault information on the network communication link 32, and the intelligent display module 14 can listen for such fault information and display the fault information to the user when it appears on the network communication link 32.

The intelligent display module 14 also includes sufficient memory to allow maintenance information to be stored therein to implement maintenance jacket functionality. The maintenance log may consist of a table comprising a variety of fields, such as registration numbers, chassis serial number, vehicle codes, and dates and descriptions of maintenance actions performed. This information may be retrieved and manipulated utilizing the computer 33 when the vehicle 10 is taken to a maintenance depot. If the computer 33 is provided with an interactive electronic technical manual (IETM) for the vehicle 10, this allows the IETM to have access to all of the diagnostic data acquired by the intelligent display module 14 as well as all of the maintenance data stored by the intelligent display module 14. This greatly enhances the ability to perform vehicle maintenance and diagnostics on the vehicle 10.

Additionally, sufficient memory capacity is preferably provided so that status information from the test interface module 21 as well as the control systems 24–30 can be sampled and stored at frequent, regular intervals in a circular data queue (i.e., with new data eventually replacing old data in the circular queue). This allows the intelligent display module 14 to provide a data logger service so that input data acquired over a period of time can be viewed to allow an assessment of dynamic conditions leading to a fault to be evaluated. Additionally, the vehicle is preferably provided with one more sensors that indicate whether a severe malfunction (e.g., the vehicle being involved in an accident) has occurred. When inputs from these sensors indicates that a severe malfunction has occurred, data logging is stopped, so that data leading up to the severe malfunction is stored in a manner similar to a so-called "black box recorder."

Figure 5:
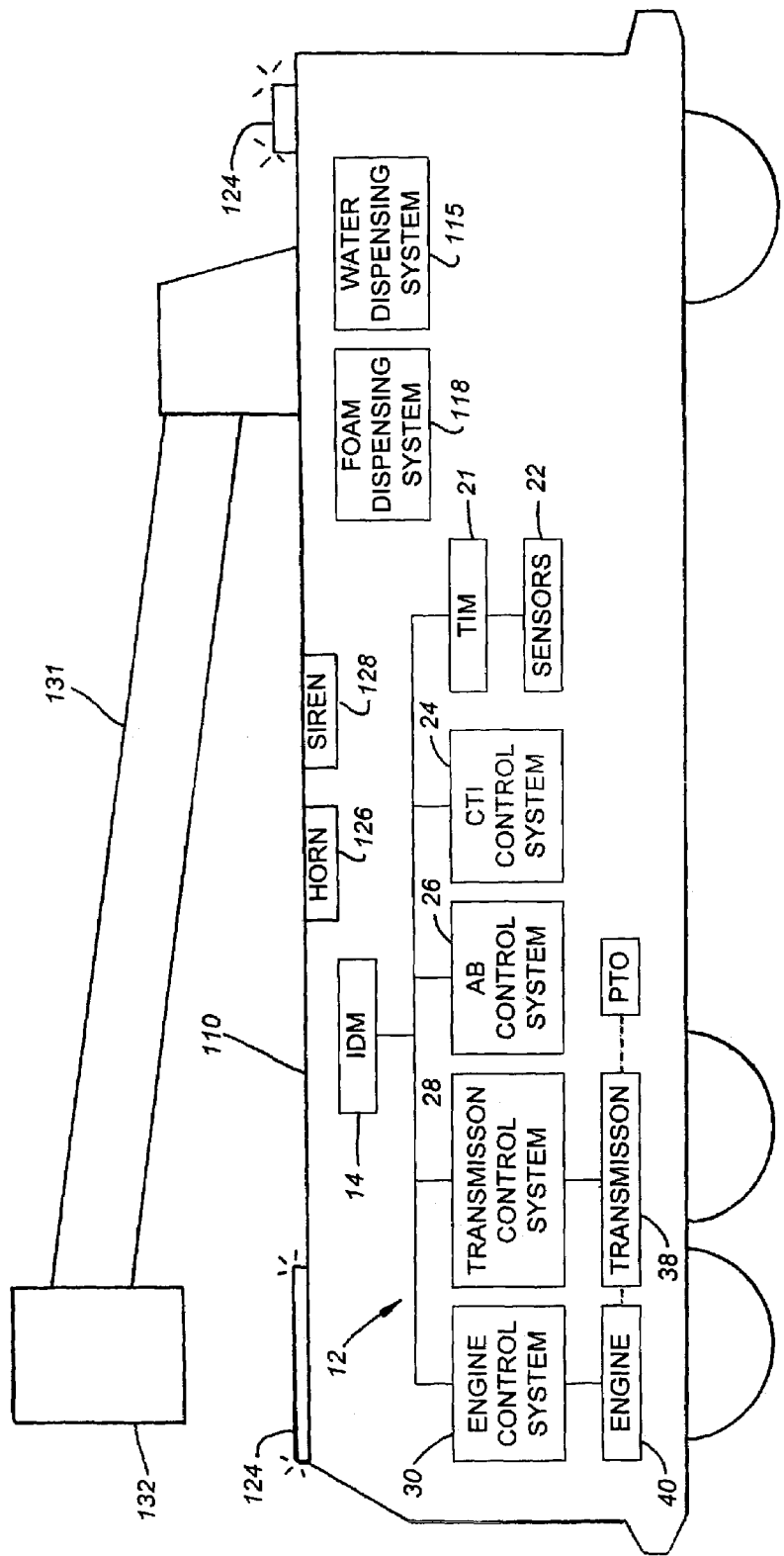
FIG. 5 is a schematic view of a firefighting vehicle having a diagnostic system in accordance with FIGS. 1–4.

Referring now to FIG. 5, a schematic view of another type of equipment service vehicle 110 that utilizes the diagnostic system 12 of FIGS. 1–4 is shown. The equipment service vehicle 110 is a firefighting vehicle and comprises a water dispensing system 115 including water hoses, pumps, control valves, and so on, used to direct water at the scene of a fire. The firefighting vehicle 110 may also comprise a foam dispensing system 118 as an alternative fire extinguishing system. The firefighting vehicle 110 also comprises emergency lighting 124, which may in practice be red and white or red, white and blue flashing lights, as well as an emergency horn 126 and an emergency siren 128 used, among other things, for alerting motorists to the presence of the firefighting vehicle 110 in transit to or at the scene of a fire. The firefighting vehicle 110 may also comprise an extendable aerial 131 that supports a basket 132 used to vertically carry firefighting personnel to an emergency situation at the scene of a fire. The diagnostic system 12 may be used to diagnose vehicle malfunctions in the manner described above in connection with the vehicle 10, as well as to diagnose malfunctions of the specialized systems described above found on firefighting vehicles.

Figure 6:
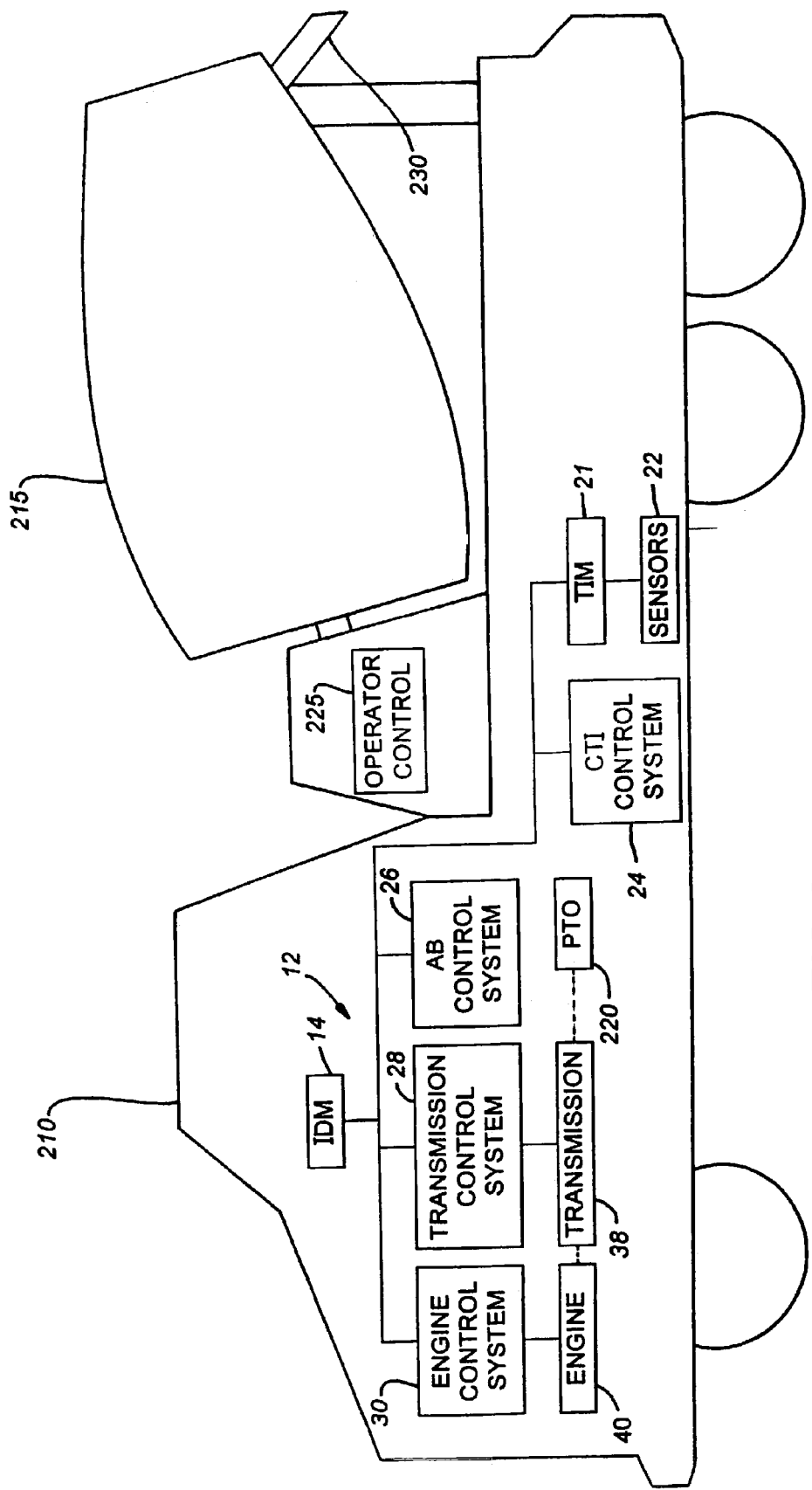
FIG. 6 is a schematic view of a mixing vehicle having a diagnostic system in accordance with FIGS. 1–4.

Referring now to FIG. 6, a schematic view of another type of equipment service vehicle 210 that utilizes the diagnostic system 12 of FIGS. 1–4 is shown. The equipment service vehicle 210 is a mixing vehicle such as a cement mixing vehicle. The mixing vehicle 210 comprises a rotatable mixing drum 215 that is driven by engine power from the engine 40 via a power takeoff mechanism 220. Rotation of the mixing drum 215 is controlled under operator control using a control system 225. The mixing vehicle 210 also includes a dispenser 230 that dispenses the mixed matter or material, for example, mixed cement. The diagnostic system 12 may be used to diagnose vehicle malfunctions in the manner described above in connection with the vehicle 10, as well as to diagnose malfunctions of the specialized systems described above found on mixing vehicles.

Figure 7:
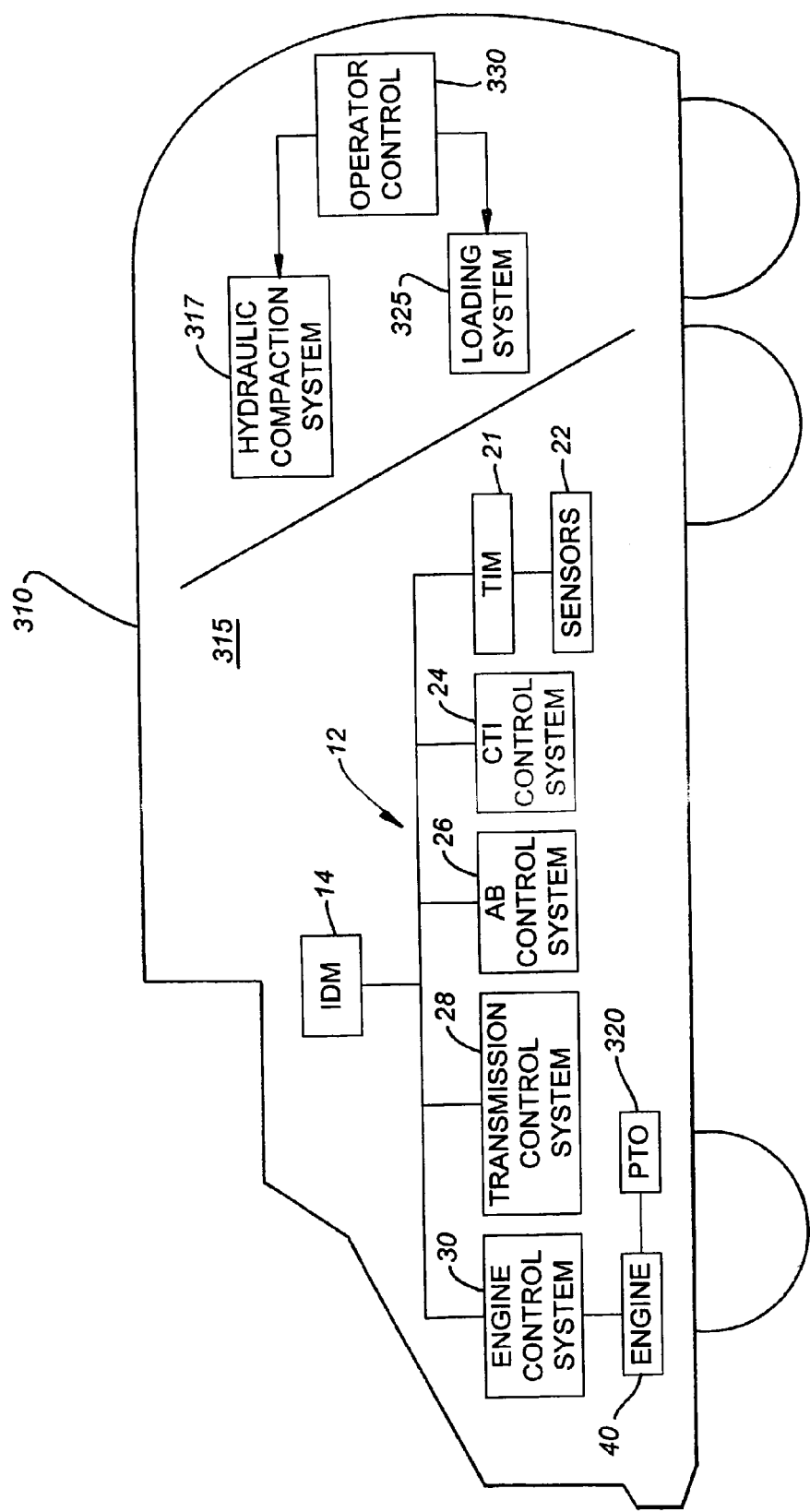
FIG. 7 is a schematic view of a refuse handling vehicle having a diagnostic system in accordance with FIGS. 1–4.

Referring now to FIG. 7, a schematic view of another type of equipment service vehicle 310 that utilizes the diagnostic system 12 of FIGS. 1–4 is shown. The equipment service vehicle 310 is a refuse handling vehicle and comprises one or more refuse compartments 315 for storing collected refuse and other materials such as goods for recycling. The refuse handling vehicle 310 also includes a hydraulic compactor 317 for compacting collected refuse. The hydraulic compactor 317 is driven by engine power from the engine 40 via a power takeoff mechanism 320. The refuse handling vehicle may also include an automatic loading or tipping system 325 for loading large refuse containers and for transferring the contents of the refuse containers into one of the compartments 315. The loading system 325 as well as the hydraulic compactor may controlled under operator control using a control system 330. The diagnostic system 12 may be used to diagnose vehicle malfunctions in the manner described above in connection with the vehicle 10, as well as to diagnose malfunctions of the specialized systems described above found on refuse handling vehicles.

Figure 8:
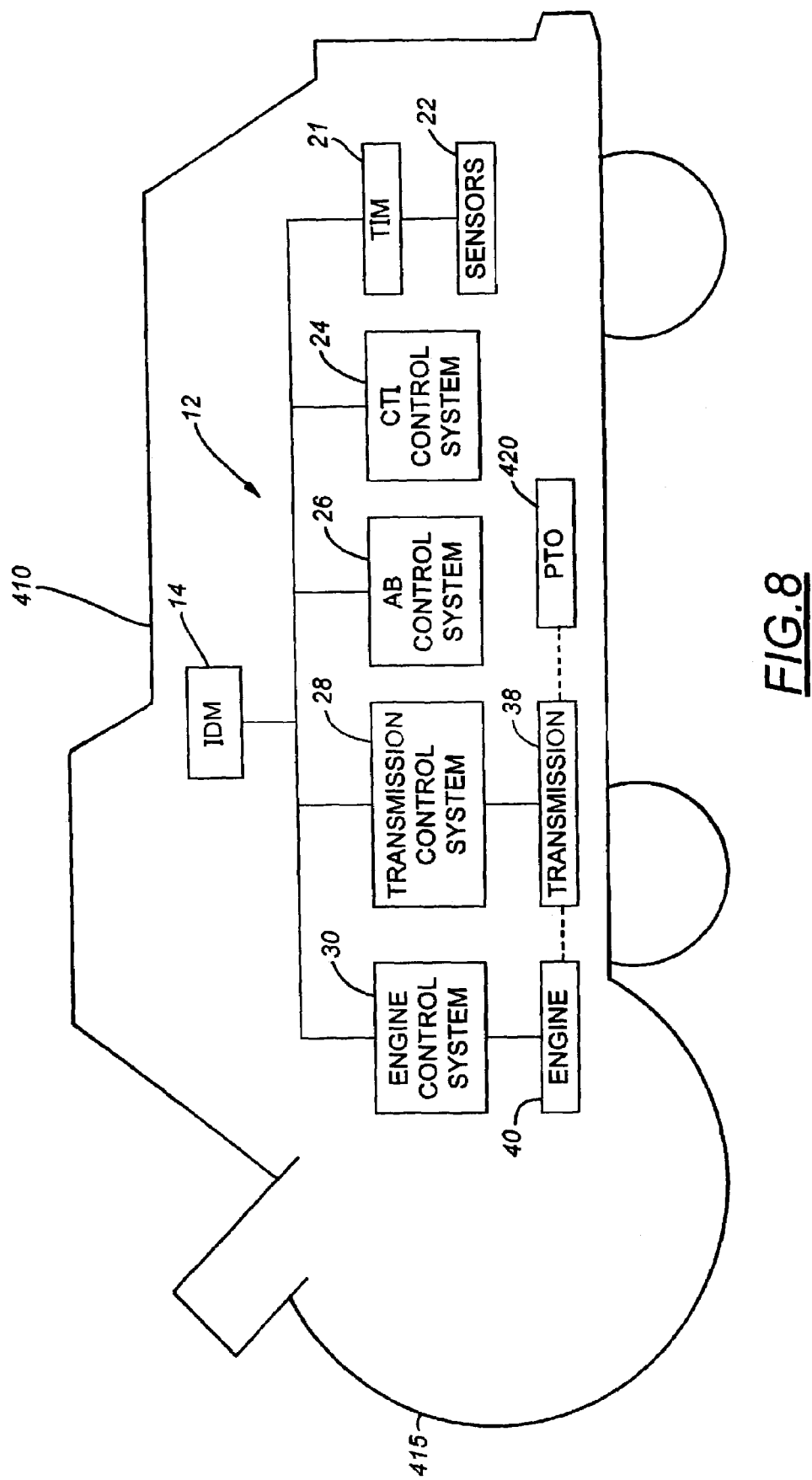
FIG. 8 is a schematic view of a snow removal vehicle having a diagnostic system in accordance with FIGS. 1–4.

Referring now to FIG. 8, a schematic view of another type of equipment service vehicle 410 that utilizes the diagnostic system 12 of FIGS. 1–4 is shown. The equipment service vehicle 410 is a snow removal vehicle and comprises a snow removal device 415 which may, for example, be a rotary blower, plow, or sweeper. The snow removal device 415 may be driven by engine power from the engine 40 via a power takeoff mechanism 420 to remove snow from a region near the snow removal vehicle 410 as the snow removal vehicle 410 is moving. The diagnostic system 12 may be used to diagnose vehicle malfunctions in the manner described above in connection with the vehicle 10, as well as to diagnose malfunctions of the specialized systems described above found on snow removal vehicles.

Advantageously, due to the utilization of a network architecture in the preferred embodiment, the diagnostic system is able to use sensors and other sources of information that are already provided on the vehicle, because it is able to interact with other vehicle control systems such as the engine control system, the anti-lock brake control system, the central tire inflation control system, and so on, via a network communication link. The fact that the diagnostic system is connected to these other systems, which are all typically capable of providing a vast array of status information, puts this status information at the disposal of the diagnostic system.

Further, due to the utilization of an intelligent display module in the preferred embodiment, it is possible for the intelligent display module to be connected to the network communication link and collect information as necessary for a variety of purposes. Thus, the preferred intelligent display module is microprocessor-based and is capable of executing firmware to provide additional functionality such as data logging, accident reconstruction, and a vehicle maintenance record. Again, this functionality can be achieved by taking advantage of the information available from the vehicle subsystems by way of the network architecture.

Moreover, by mounting the intelligent display module on board the vehicle in the preferred embodiment, for example, in an operator compartment, it is not necessary to bring the vehicle to a maintenance depot to have vehicle malfunctions diagnosed. The services offered by the intelligent display module are available wherever and whenever the vehicle is in operation.

Many other changes and modifications may be made to the present invention without department from the spirit thereof. The scope of these and other changes will become apparent from the appended claims.

What is claimed is:

1. An equipment service vehicle comprising:
   (A) a network communication link;
   (B) a plurality of vehicle subsystems, each vehicle subsystem comprising a mechanical system and an electronic control system that controls the mechanical system, each respective electronic control system being connected to the network communication link and transmitting information pertaining to the health and operation of the mechanical system on the network communication link;
   (C) a test control module, the test control module being mounted on-board the vehicle, the test control module being coupled to the plurality of vehicle subsystems by way of the network communication link, the test control module being programmed to acquire at least some of the information pertaining to the health and operation of the mechanical system; and
   (D) an operator interface, the operator interface being mounted on-board the vehicle, the operator interface being coupled to the test control module, the operator interface comprising
      (1) a display that displays a menu of test options to an operator, and
      (2) an input device that receives an operator input indicative of a menu selection made by the operator, the menu selection indicating a test selected by the operator,
   and wherein the display further displays to the operator at least some of the information pertaining to the health and operation of the mechanical system, including results of the test.

2. An equipment service vehicle according to claim 1, wherein the equipment service vehicle is a military vehicle.

3. An equipment service vehicle according to claim 1, wherein the equipment service vehicle is a firefighting vehicle.

4. An equipment service vehicle according to claim 1, wherein the equipment service vehicle is a snow removal vehicle.

5. An equipment service vehicle according to claim 1, wherein the equipment service vehicle is a refuse handling vehicle.

6. An equipment service vehicle according to claim 1, wherein the test control module and the operator interface are provided as a single integrated unit.

7. An equipment service vehicle according to claim 1, wherein the test control module and the operator interface are mounted on-board the vehicle in semi-permanent fashion.

8. An equipment service vehicle according to claim 1, wherein the test control module and the operator interface are provided as a single integrated unit, and wherein the equipment service vehicle further comprises a mounting structure configured to mount the integrated unit to an operator panel of the vehicle.

9. An equipment service vehicle comprising:
   (A) a network communication link;
   (B) an engine system, the engine system including an engine and an electronic engine control system that is coupled to the engine and to the network communication link, the electronic engine control system controlling the engine and transmitting information pertaining to the health and operation of the engine on the network communication link;
   (C) a transmission system, the transmission system including a transmission and an electronic transmission control system, the electronic transmission control system controlling the transmission and transmitting information pertaining to the health and operation of the transmission on the network communication link;
   (D) a test control module, the test control module being mounted on-board the vehicle, the test control module being coupled to the engine system and the transmission system by way of the network communication link, the test control module being programmed to acquire at least some of the information pertaining to the health and operation of the engine system and the transmission system; and
   (E) an operator interface, the operator interface being mounted on-board the vehicle, the operator interface being coupled to the network communication link by way of the test control module, the operator interface including (1) a display that displays a plurality of test options to an operator, and
(2) an input device that receives an operator input indicative of a selection made by the operator, the selection indicating a test selected by the operator;

(F) a plurality of sensors; and (G) a test interface module that is electrically disposed between at least some of the plurality of sensors and the network communication link, the test interface module being capable of converting electrical signals from the sensors to a format suitable for transmission on the network communication link; and wherein the display further displays the health and operation information of the engine and the transmission to a human operator, including results of the test.

10. An equipment service vehicle according to claim 9, wherein the sensors are analog sensors and the test interface module includes a plurality of analog-digital converters to convert input signals from the plurality of sensors to digital format.

11. An equipment service vehicle comprising:

(A) a network communication link;

(B) a plurality of vehicle subsystems, each vehicle subsystem comprising a mechanical system and an electronic control system that controls the mechanical system, each respective electronic control system being connected to the network communication link and transmitting information pertaining to the health and operation of the mechanical system on the network communication link;

(C) a test control module, the test control module being coupled to the plurality of vehicle subsystems by way of the network communication link, the test control module being programmed to acquire at least some of the information pertaining to the health and operation of the mechanical system; and (D) an operator interface, the operator interface being coupled to the test control module, the operator interface comprising
(1) a display that displays a menu of test options to an operator, and
(2) an input device that receives an operator input indicative of a menu selection made by the operator, the menu selection indicating a test selected by the operator;

(E) a mounting structure, the mounting structure being configured to mount the test control module and the operator interface to the vehicle; and and wherein the display further displays to the operator at least some of the information pertaining to the health and operation of the mechanical system, including results of the test.

12. An equipment service vehicle comprising:

(A) a network communication link;

(B) an engine system, the engine system including an engine and an electronic engine control system that is coupled to the engine and to the network communication link, the electronic engine control system controlling the engine and transmitting information pertaining to the health and operation of the engine on the network communication link;

(C) a transmission system, the transmission system including a transmission and an electronic transmission control system, the electronic transmission control system controlling the transmission and transmitting information pertaining to the health and operation of the transmission on the network communication link;

(D) a test control module, the test control module being mounted on-board the vehicle, the test control module being coupled to the engine system and the transmission system by way of the network communication link, the test control module being programmed to acquire at least some of the information pertaining to the health and operation of the engine system and the transmission system; and (E) an operator interface, the operator interface being mounted on-board the vehicle, the operator interface being coupled to the network communication link by way of the test control module, the operator interface including
(1) a display that displays a plurality of test options to an operator, and
(2) an input device that receives an operator input indicative of a selection made by the operator, the selection indicating a test selected by the operator; and wherein the display further displays the health and operation information of the engine and the transmission to a human operator, including results of the test.

13. An equipment service vehicle according to claim 12, further comprising a memory that stores a running log of the status information pertaining to the engine and the status information pertaining to the transmission.

14. An equipment service vehicle according to claim 12, wherein the display is mounted in a location that is viewable from within an operator compartment of the vehicle.

15. An equipment service vehicle according to claim 12, wherein the operator interface is mounted in an operator compartment of the vehicle in semi-permanent fashion.

16. An equipment service vehicle according to claim 12, wherein the test control module and the operator interface are provided as a single integrated unit, and wherein the equipment service vehicle further comprises a mounting structure configured to mount the integrated unit to an operator panel of the vehicle.

17. An equipment service vehicle according to claim 12, wherein the equipment service vehicle is a firefighting vehicle.

18. An equipment service vehicle according to claim 12, further comprising a memory that stores a vehicle maintenance record, the vehicle maintenance record comprising a descriptive log of maintenance activities performed on the vehicle.

19. An equipment service vehicle according to claim 12, wherein the equipment service vehicle is a military vehicle.

* * * * *